United States Patent
Kondo et al.

(10) Patent No.: US 7,856,060 B2
(45) Date of Patent: Dec. 21, 2010

(54) MOVING PICTURE CODING METHOD AND MOVING PICTURE DECODING METHOD FOR PERFORMING INTER PICTURE PREDICTION CODING AND INTER PICTURE PREDICTION DECODING USING PREVIOUSLY PROCESSED PICTURES AS REFERENCE PICTURES

(75) Inventors: Satoshi Kondo, Yawata (JP); Shinya Kadono, Nishinomiya (JP); Makoto Hagai, Moriguchi (JP); Kiyofumi Abe, Kadoma (JP)

(73) Assignee: Panasonic Corporation, Osaka (JP)

( * ) Notice: Subject to any disclaimer, the term of this patent is extended or adjusted under 35 U.S.C. 154(b) by 293 days.

(21) Appl. No.: 11/980,556

(22) Filed: Oct. 31, 2007

(65) Prior Publication Data

US 2008/0063060 A1  Mar. 13, 2008

Related U.S. Application Data

(62) Division of application No. 10/468,119, filed as application No. PCT/JP03/02099 on Feb. 26, 2003, now Pat. No. 7,664,180.

(30) Foreign Application Priority Data

| Mar. 4, 2002 | (JP) | ............................. 2002-056919 |
| Apr. 19, 2002 | (JP) | ............................. 2002-118598 |
| Jul. 2, 2002 | (JP) | ............................. 2002-193027 |

(51) Int. Cl.
    *H04N 7/12* (2006.01)
(52) U.S. Cl. ................................. 375/240.16
(58) Field of Classification Search ............ 375/240.01, 375/240.14, 240.15, 240.16; *H04N 7/12*
See application file for complete search history.

(56) References Cited

U.S. PATENT DOCUMENTS 5,329,365 A  7/1994  Uz (Continued)

FOREIGN PATENT DOCUMENTS

CN          1136877          11/1996

(Continued)

OTHER PUBLICATIONS

Wiegand et al, Working Draft No. 2, Revision 8, Jan. 29, 2002, JVT-of ISO/IEC MPEG and ITU-T VCEG, Sec. 11.4.2.*

(Continued)

*Primary Examiner*—Young Lee
(74) *Attorney, Agent, or Firm*—Wenderoth, Lind & Ponack, L.L.P.

(57) ABSTRACT

A coding control unit (110) and a mode selection unit (109) are included. The coding control unit (110) determines the coding order for a plurality of consecutive B-pictures located between I-pictures and P-pictures so that the B-picture whose temporal distance from two previously coded pictures is farthest in display order is coded by priority, so as to reorder the B-pictures in coding order. When a current block is coded in direct mode, the mode selection unit 109 scales a forward motion vector of a block which is included in a backward reference picture of a current picture and co-located with the current block, so as to generate motion vectors of the current block, if the forward motion vector has been used for coding the co-located block.

3 Claims, 21 Drawing Sheets

U.S. PATENT DOCUMENTS

| | | | |
|---|---|---|---|
| 5,386,234 | A | 1/1995 | Veltman et al. |
| 5,410,354 | A | 4/1995 | Uz |
| 5,724,446 | A | 3/1998 | Liu et al. |
| 5,809,173 | A | 9/1998 | Liu et al. |
| 5,886,742 | A | 3/1999 | Hibi et al. |
| 6,097,842 | A | 8/2000 | Suzuki et al. |
| 6,108,449 | A | 8/2000 | Sekiguchi et al. |
| 6,205,177 | B1 | 3/2001 | Girod et al. |
| 6,389,173 | B1 | 5/2002 | Suzuki et al. |
| 6,396,874 | B1 | 5/2002 | Kato |
| 6,427,027 | B1 | 7/2002 | Suzuki et al. |
| 6,459,812 | B2 | 10/2002 | Suzuki et al. |
| 6,611,558 | B1 | 8/2003 | Yokoyama |
| 6,738,980 | B2 | 5/2004 | Lin et al. |
| RE38,563 | E | 8/2004 | Eifrig et al. |
| 6,807,231 | B1 | 10/2004 | Wiegand et al. |
| 6,980,596 | B2 | 12/2005 | Wang et al. |
| 2001/0014178 | A1 | 8/2001 | Boon |
| 2002/0001411 | A1 | 1/2002 | Suzuki et al. |
| 2002/0012523 | A1 | 1/2002 | Nakatani |
| 2005/0111550 | A1 | 5/2005 | Wang et al. |
| 2006/0072662 | A1 | 4/2006 | Tourapis et al. |

FOREIGN PATENT DOCUMENTS

| | | |
|---|---|---|
| CN | 1207228 | 2/1999 |
| EP | 0 542 195 | 5/1993 |
| EP | 0 863 674 | 9/1998 |
| EP | 1 406 453 | 4/2004 |
| JP | 4-20088 | 1/1992 |
| JP | 4-245790 | 9/1992 |
| JP | 5-137131 | 6/1993 |
| JP | 6-62391 | 3/1994 |
| JP | 9-65342 | 3/1997 |
| JP | 10-126787 | 5/1998 |
| JP | 11-239353 | 8/1999 |
| JP | 2001-25019 | 1/2001 |
| JP | 2001-45475 | 2/2001 |
| JP | 2001-45498 | 2/2001 |
| JP | 2001-224036 | 8/2001 |
| JP | 2001-268581 | 9/2001 |
| KR | 1999-23089 | 3/1999 |
| WO | 98/59496 | 12/1998 |
| WO | 03/047271 | 6/2003 |
| WO | 03/047272 | 6/2003 |

OTHER PUBLICATIONS

International Search Report issued Aug. 5, 2003 in the International (PCT) Application No. PCT/JP03/04805.
Supplementary European Search Report issued Apr. 18, 2006 in European Application No. EP 03 72 5587.
Office Action issued Sep. 19, 2007 in U.S. Appl. No. 10/480,928.
Office Action issued Apr. 29, 2008 in U.S. Appl. No. 10/480,928.
Office Action issued Sep. 18, 2008 in U.S. Appl. No. 11/976,750.
Office Action issued Nov. 21, 2008 in U.S. Appl. No. 10/480,928.
Office Action issued Apr. 28, 2009 in U.S. Appl. No. 10/480,928.
Thomas Wiegand, "*Working Draft No. 2, Revision 2 (WD-2)*", Document JVT-B118R2, Mar. 15, 2003, pp. 1-106 (XP002245569).
Satoshi Kondo et al., "*Proposal for Minor Changes to Multi-Frame Buffering Syntax for Improving Coding Efficiency of B-Pictures*", ISO/IEC JTC1/SC29/WG11 and ITU-T SG16 Q.6, XX, XX, Jan. 29, 2002, pp. 1-10, (XP002249662).
T. Wiegand, "*H.26L Test Model Long-Term No. 9 (TML-9) Draft0*", ITU-T Telecommunication Standardization Sector of ITU, Geneva, CH, Dec. 21, 2001, pp. 1, 3-75, (XP001086625).
Office Action issued Apr. 15, 2009 in U.S. Appl. No. 11/976,750.
Office Action issued Mar. 31, 2009 in U.S. Appl. No. 11/980,557.
H. 26L Test Model Long Term No. 6(TML-6) draft 0. [Online], ITU-Telecommunications Standardization Sector Study Group 16 Video Coding Experts Group (VCEG), 2001. [retrieved on May 28, 2003], pp. 28-33. Retrieved from the Internet:<URL:http://kbs.cs.tu-berlin.derstewe/vceg/TMLDocs/VCEG-L45d0.doc>.
H. 26L Test Model Long Term No. 6(TML-6) draft 0. [Online], ITU-Telecommunications Standardization Sector Study Group 16 Video Coding Experts Group (VCEG), 2001. [retrieved on May 28, 2003], pp. 28-33. Retrieved from the Internet:<URL:http://kbs.cs.tu-berlin.derstewe/vceg/TMLDocs/VCEG-L45d0.doc>.
Satoshi Kondo et al., "*Proposal for Minor Changes to Multi-Frame Buffering Syntax for Improving Coding Efficiency of B-Pictures*", ISO/IEC JTC1/SC29/WG11 and ITU-T SG16 Q.6, Jan. 29, 2002, pp. 1-10, XP002249662.
M. Flierl et al., "*A Locally Optimal Design Algorithm for Block-Based Multi-Hypothesis Motion-Compensated Prediction*", Data Compression Conference, 1998. DCC '98. Proceedings Snowbird, UT, USA Mar. 30-Apr. 1, 1998, Los Alamitos, CA, USA, IEEE Comput. Soc. US, Mar. 30, 1998, pp. 239-248, XP010276624.
Satoshi Kondo et al., "*Proposal for Minor Changes to Multi-Frame Buffering Syntax for Improving Coding Efficiency of B-Pictures*", ISO/IEC JTC1/SC29/WG11 and ITU-T SG16 Q.6, Jan. 29, 2002, pp. 1-10, XP002249662.
M. Flierl et al., "*A Locally Optimal Design Algorithm for Block-Based Multi-Hypothesis Motion-Compensated Prediction*", Data Compression Conference, 1998. DCC '98. Proceedings Snowbird, UT, USA Mar. 30-Apr. 1, 1998, Los Alamitos, CA, USA, IEEE Comput. Soc. US, Mar. 30, 1998, pp. 239-248, XP010276624.
Limin Wang, et al., "*JVT-B071r2—Adaptive rame/Field Coding for JVT*", JVT of ISO/IEC MPEG & ITU-T VCEG (ISO/IEC) JTC1/SC29/WG11 and ITU-T SG16 Q.6), Jan. 29, 2002, pp. 1-24; XP002377315.
Michael Gallant and Guy Cote, *VCEG-N84—High Rate, High Resolution Video Using H26L*, ITU-T, VCEG, Study Group 16 Question 6, Sep. 24, 2001, pp. 1-7, XP002376024.
T. Wiegand, "*Test Model Long-Term No. 9 (TML-9) Draft0*", ITU-T Telecommunication Standardization Sector of ITU, Geneva, CH, Dec. 21, 2001, pp. 1, 3-75, XP 001086625.
International Search Report issued Jun. 13, 2003 in International Application PCT/JP03/02099.
Supplementary Partial European Search Report issued Jun. 2, 2005 in European Patent Application EP 03707082.
Supplementary European Search Report issued Apr. 19, 2006 in European Patent Application EP 03707082.
U.S. Office Action issued Jan. 31, 2008 in U.S. Appl. No. 10/468,119.
Office Action issued Jun. 18, 2008 in the European Patent Application No. 03707082.8.

* cited by examiner

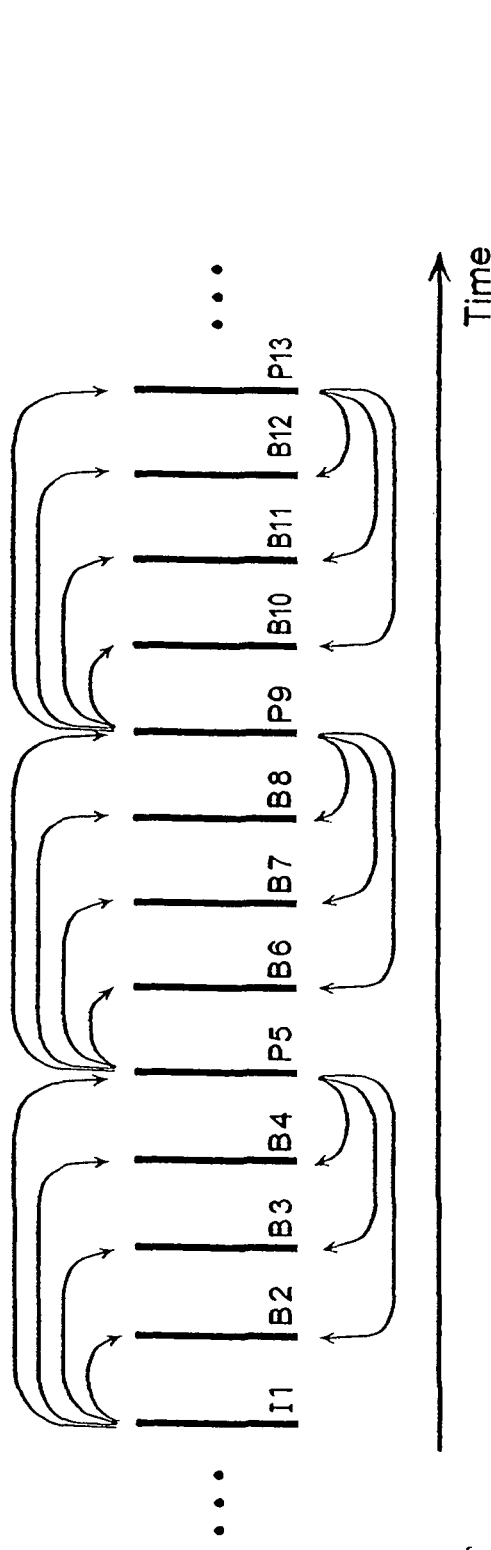
PRIOR ART
Fig. 1A
PRIOR ART
Fig. 1B

PRIOR ART
Fig. 2
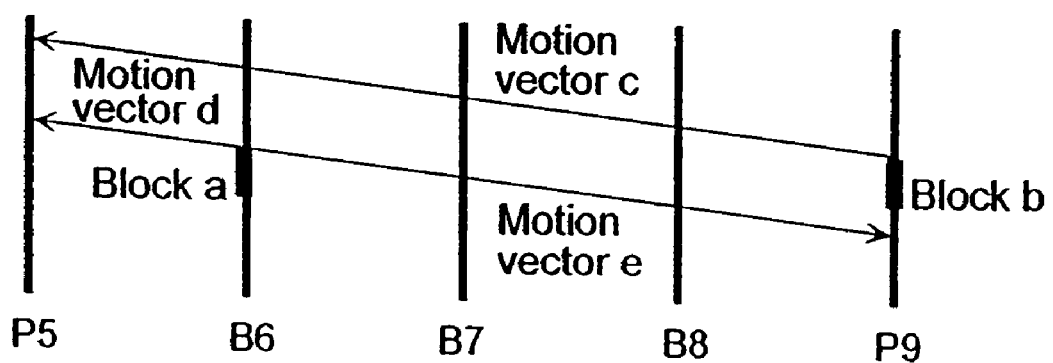

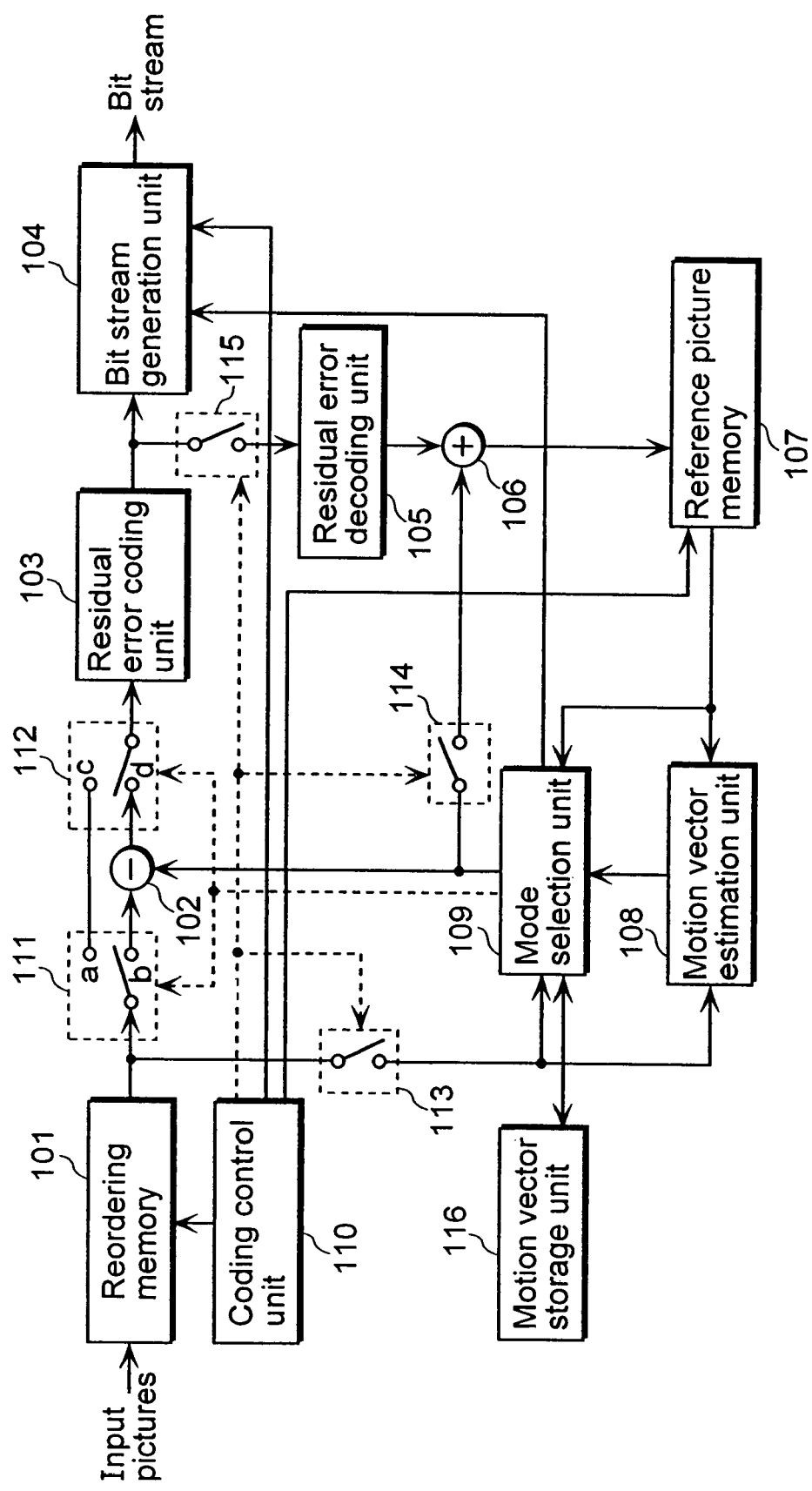
Fig. 3

Fig. 4A

| | P5 | B6 | B7 | B8 | P9 |
|---|---|---|---|---|---|
| First relative index | 1 | 0 | — | 2 | 3 |
| Second relative index | 3 | 2 | — | 0 | 1 |

Current Picture → B7

Display order →

Fig. 4B

| | P5 | B6 | B7 | B8 | P9 |
|---|---|---|---|---|---|
| First relative index | 0 | 1 | — | 2 | 3 |
| Second relative index | 3 | 2 | — | 1 | 0 |

Current Picture → B7

Display order →

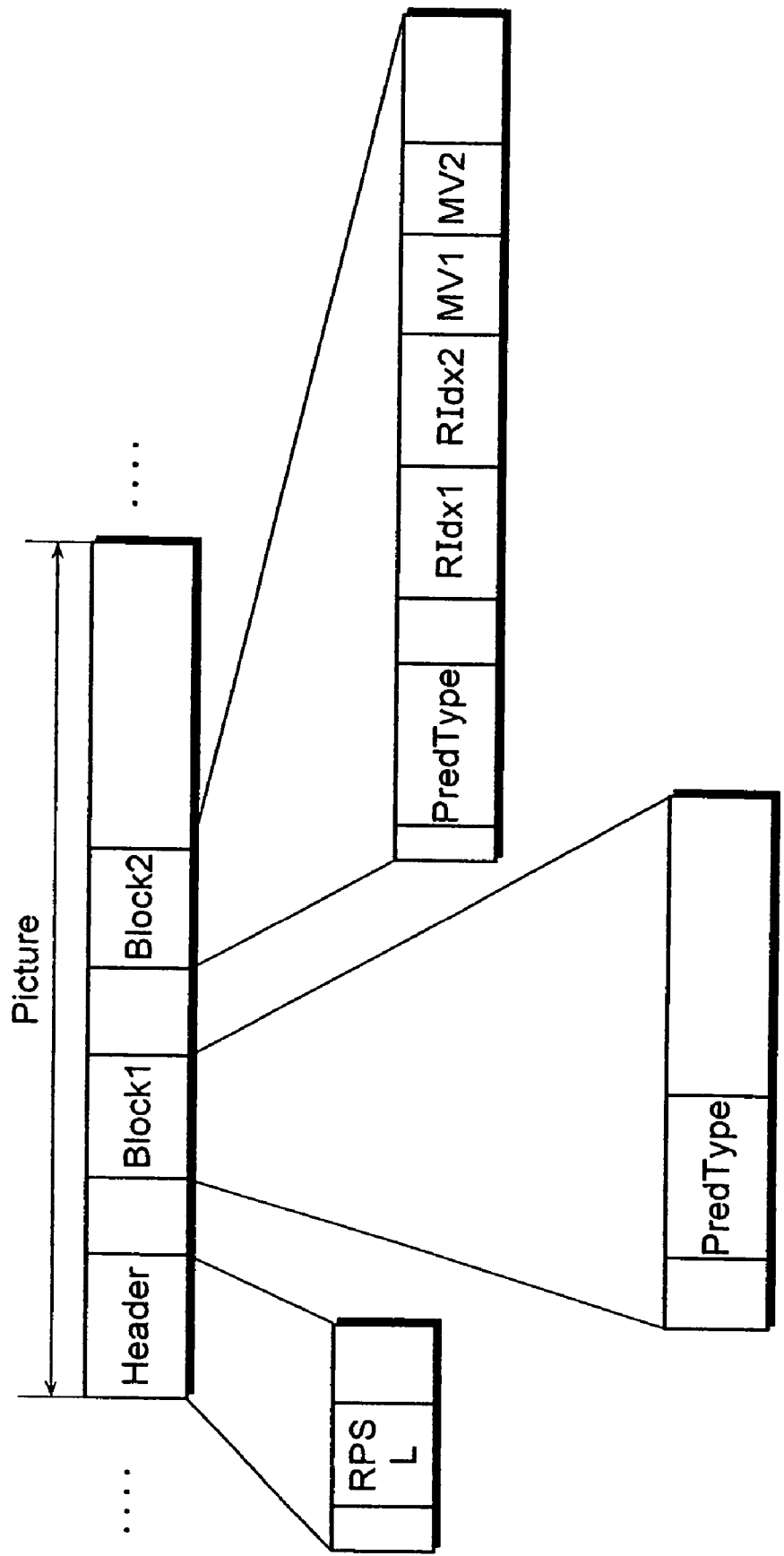
Fig. 5

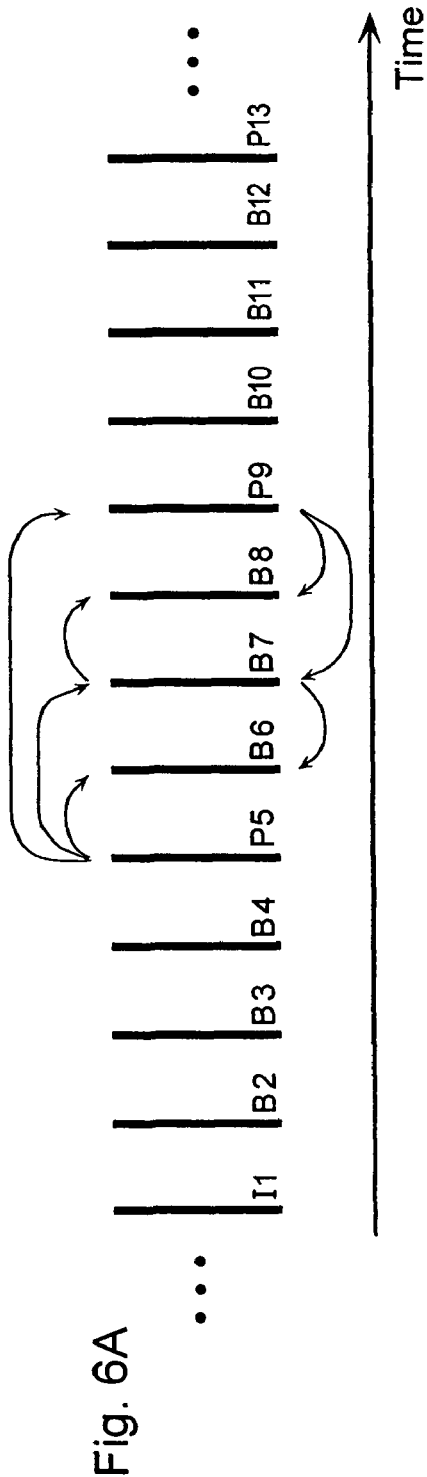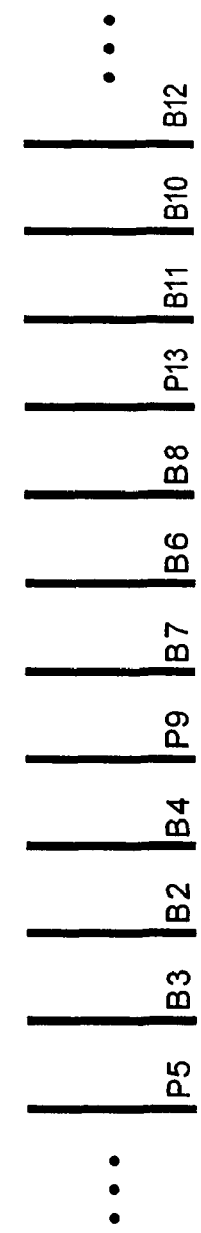
Fig. 6A
Fig. 6B

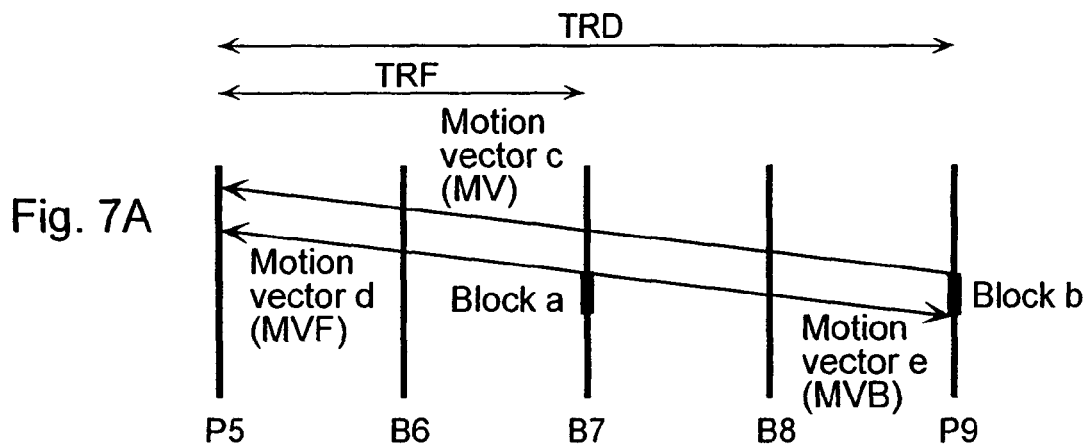
Fig. 7A
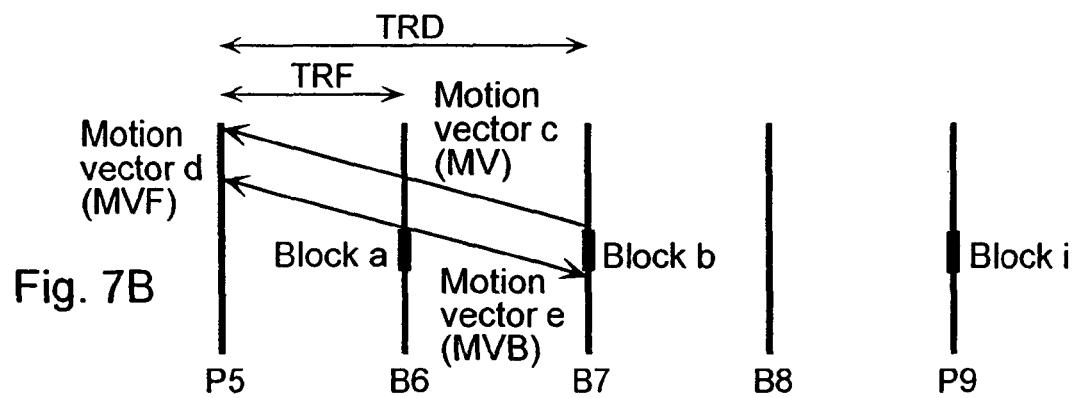
Fig. 7B
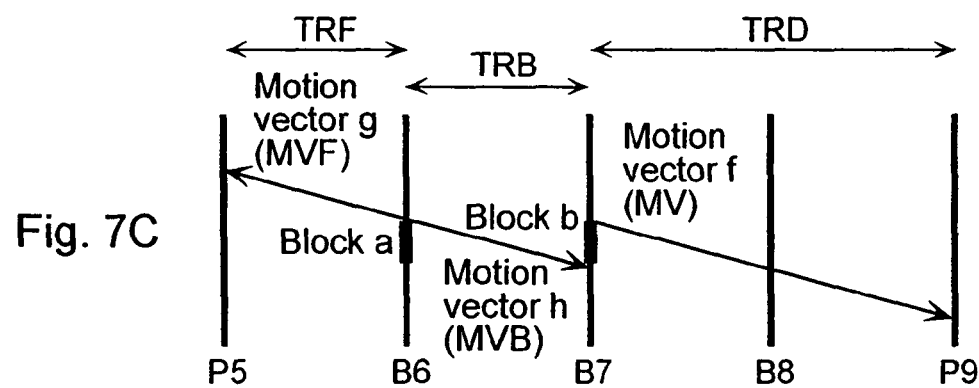
Fig. 7C
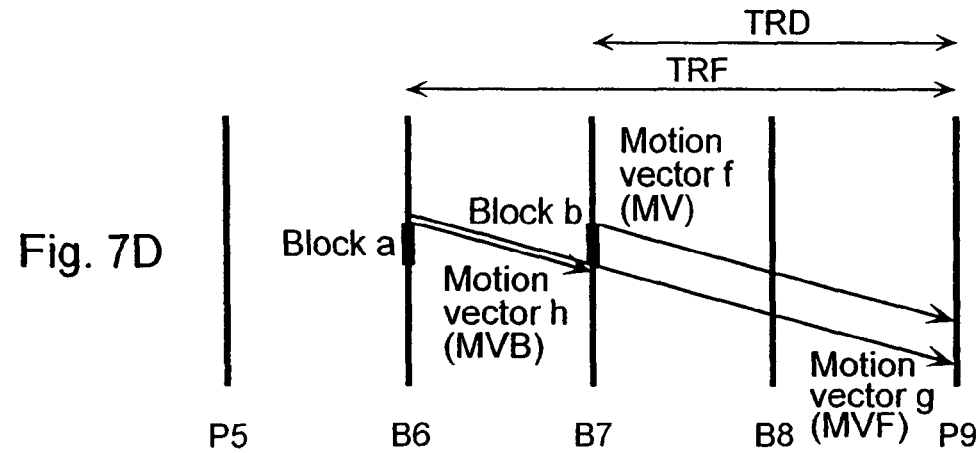
Fig. 7D

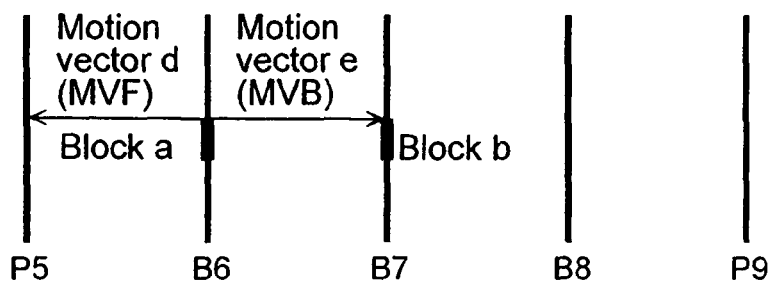
Fig. 8A
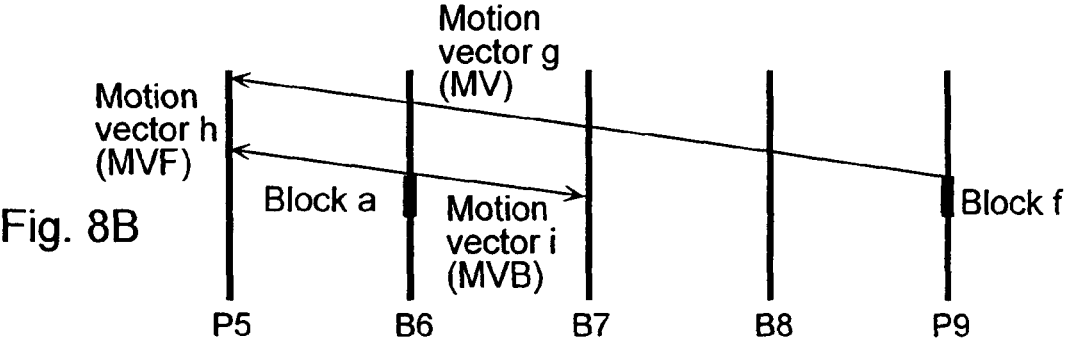
Fig. 8B
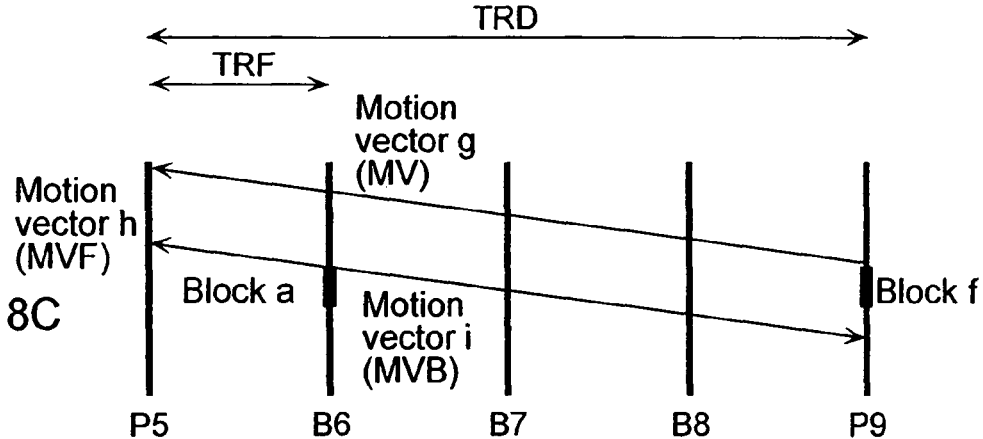
Fig. 8C
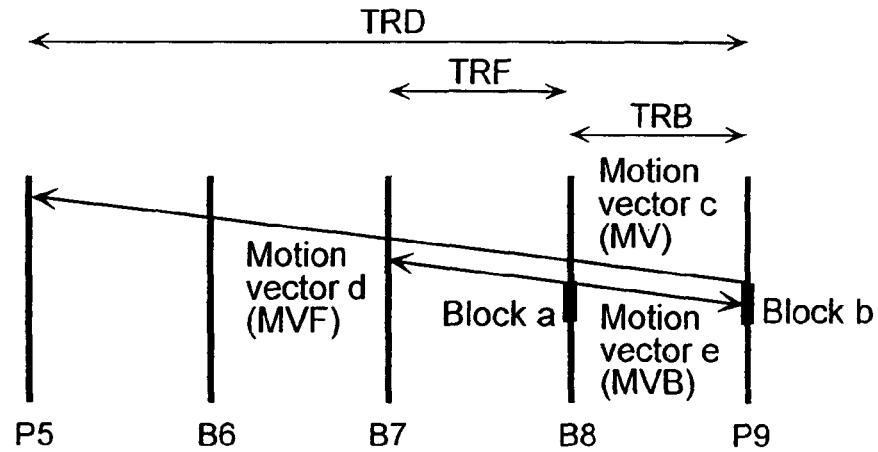
Fig. 8D

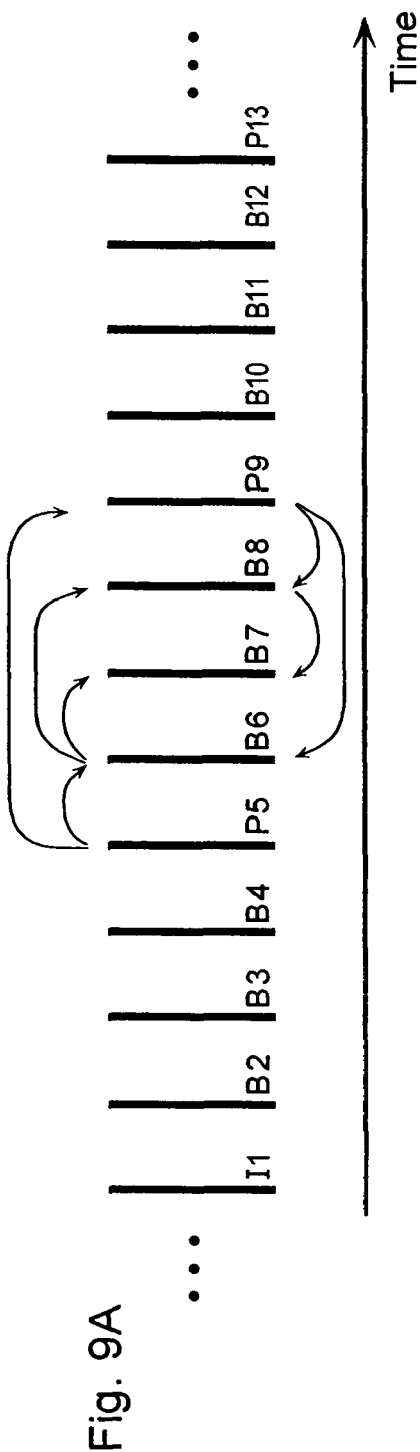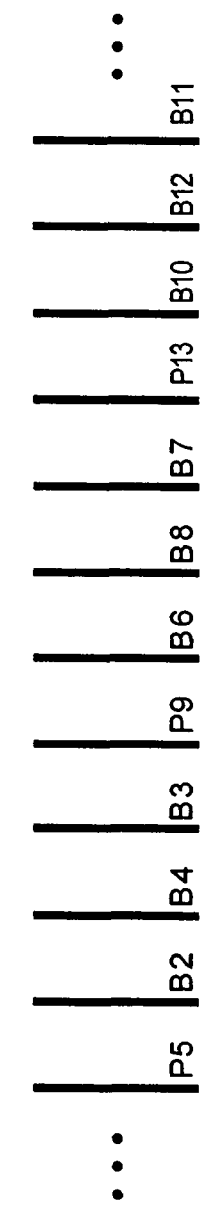
Fig. 9A
Fig. 9B

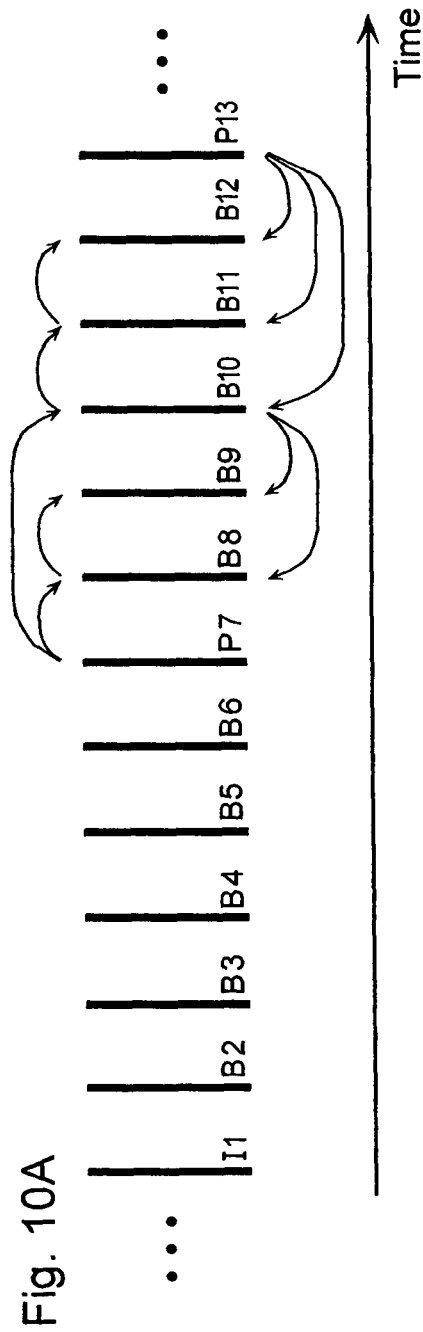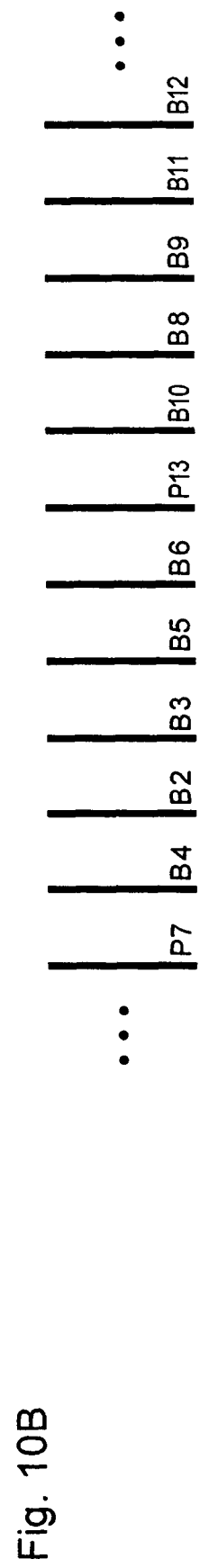

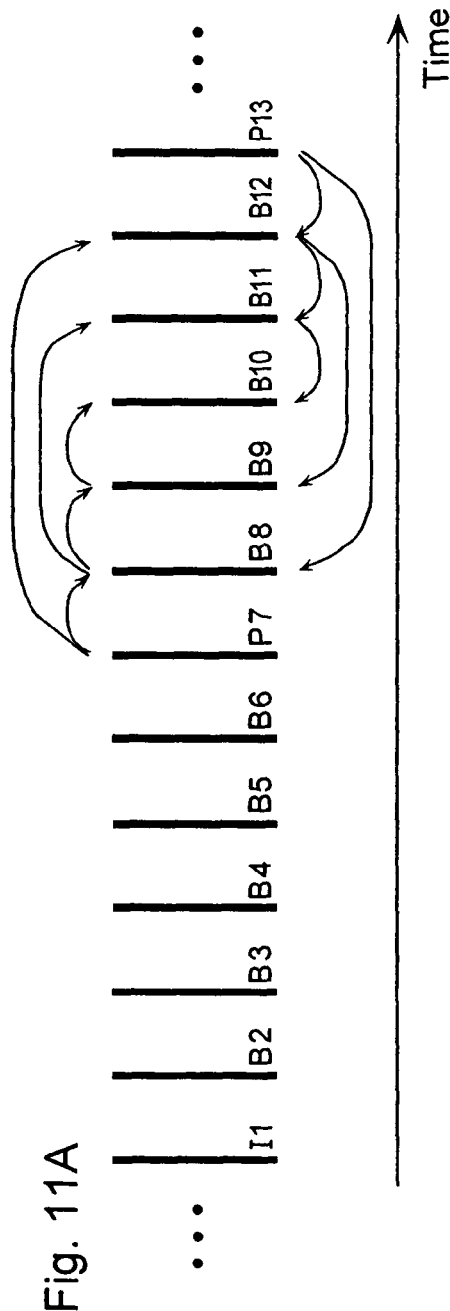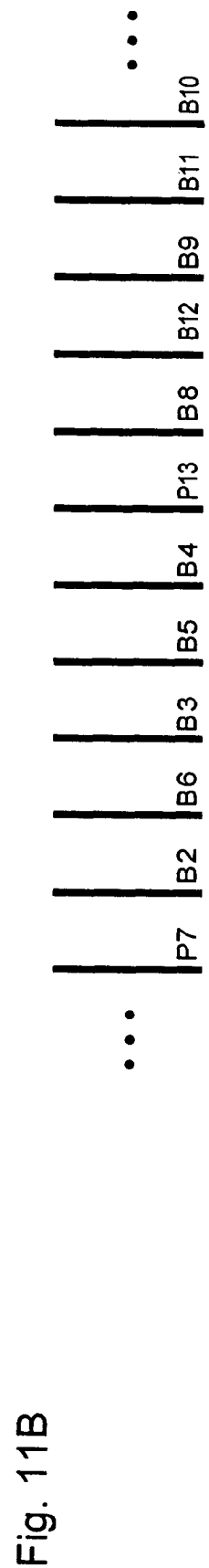
Fig. 11A
Fig. 11B

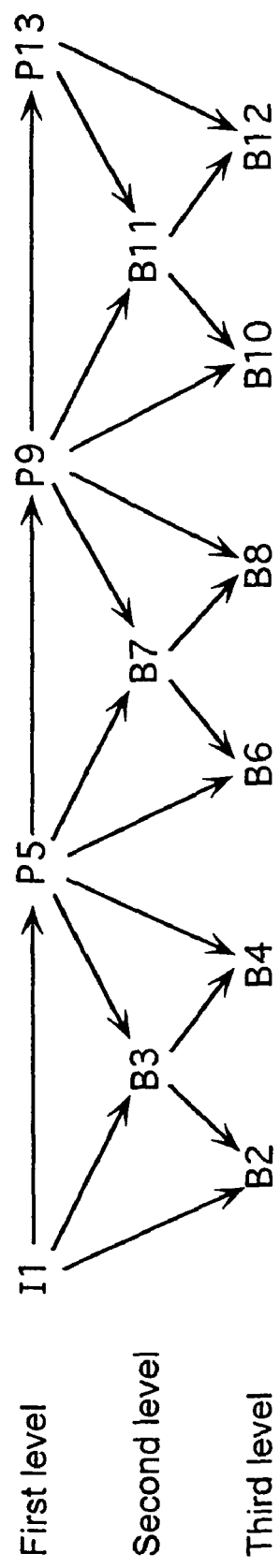
Fig. 12

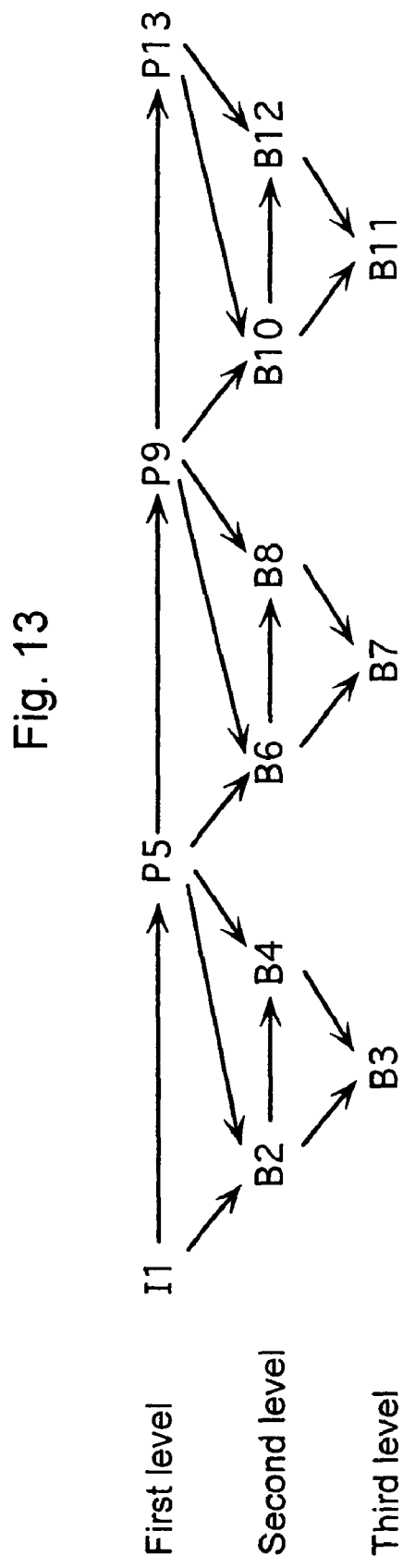

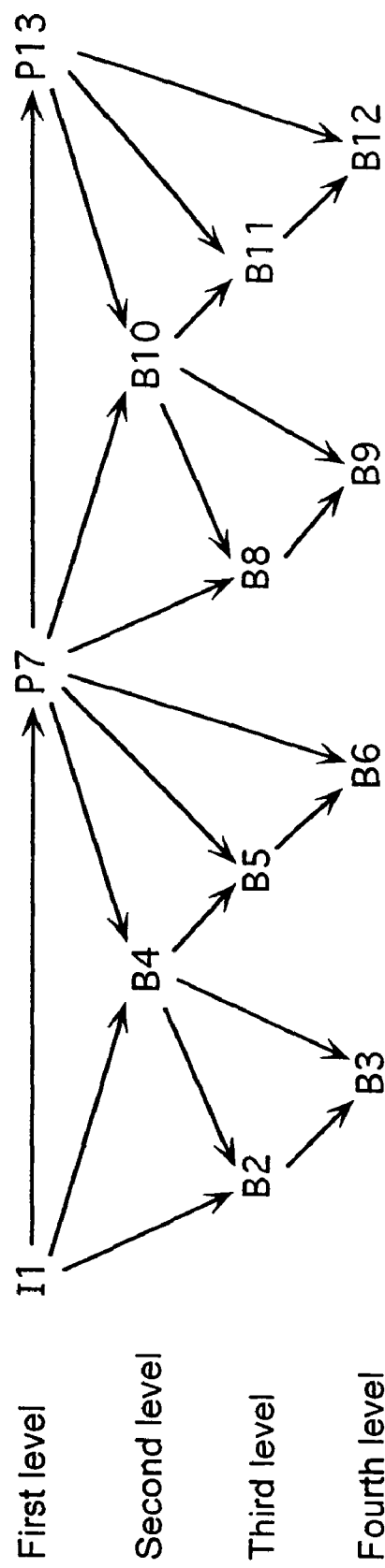
Fig. 14

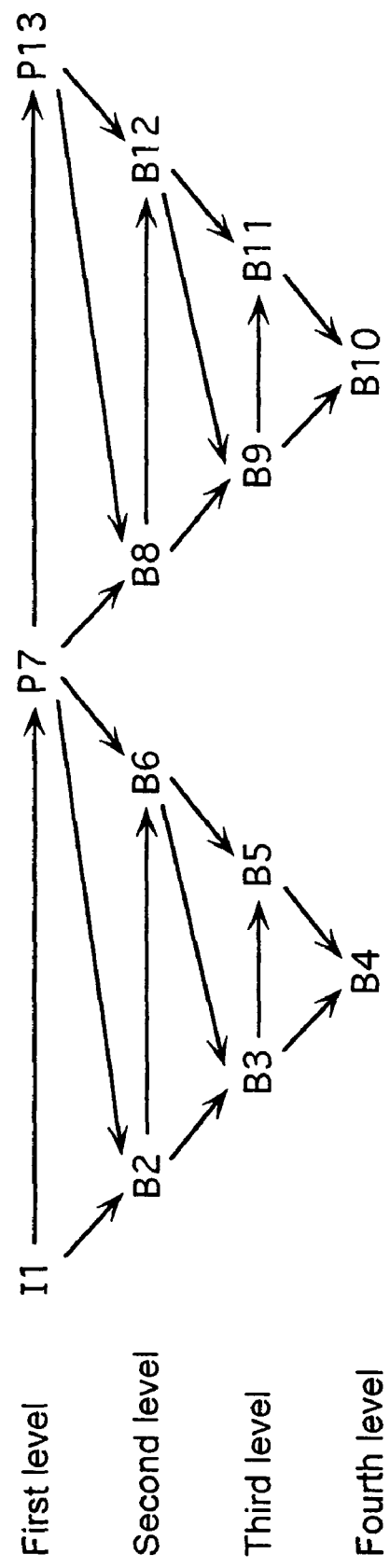
Fig. 15

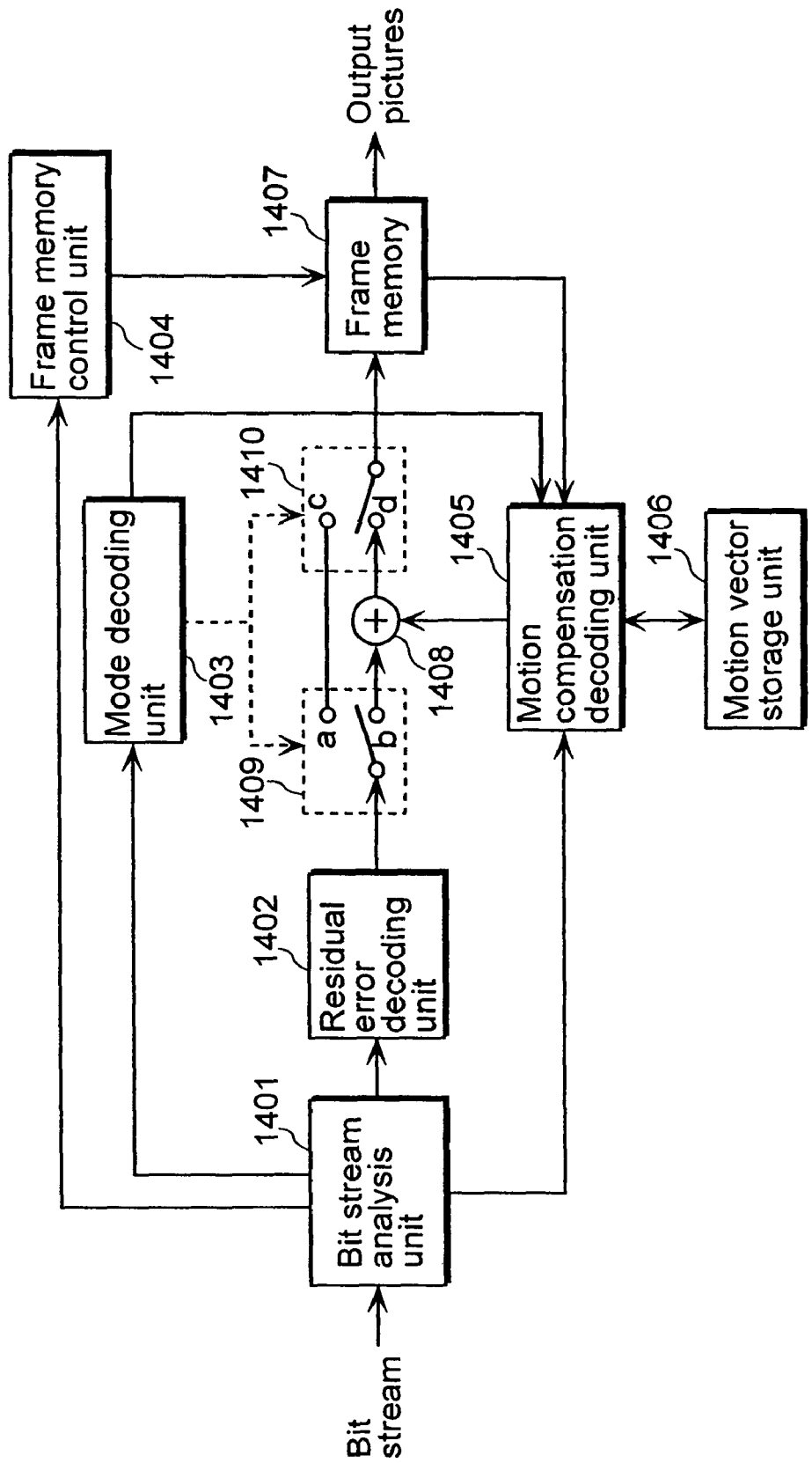
Fig. 16

Fig. 17A
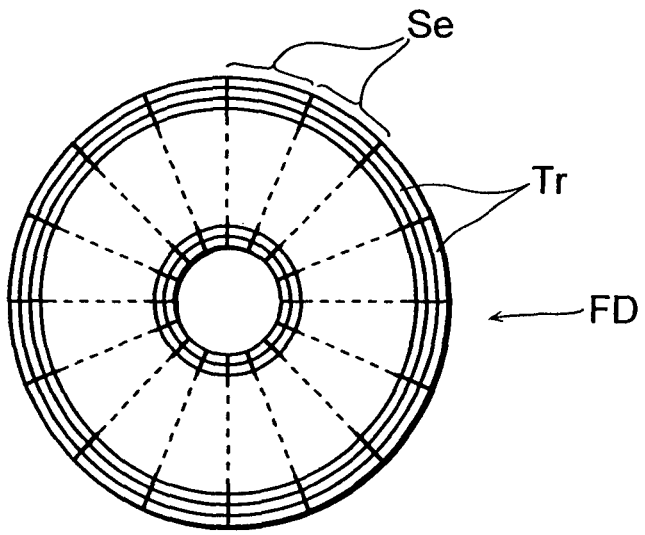
Fig. 17B
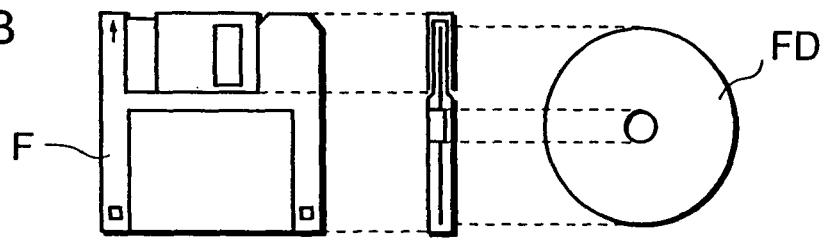
Fig. 17C
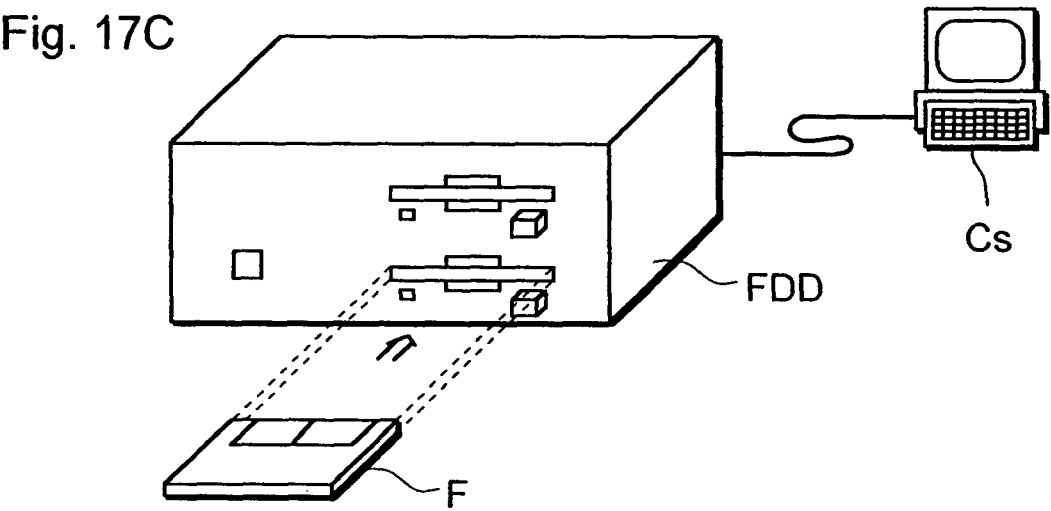

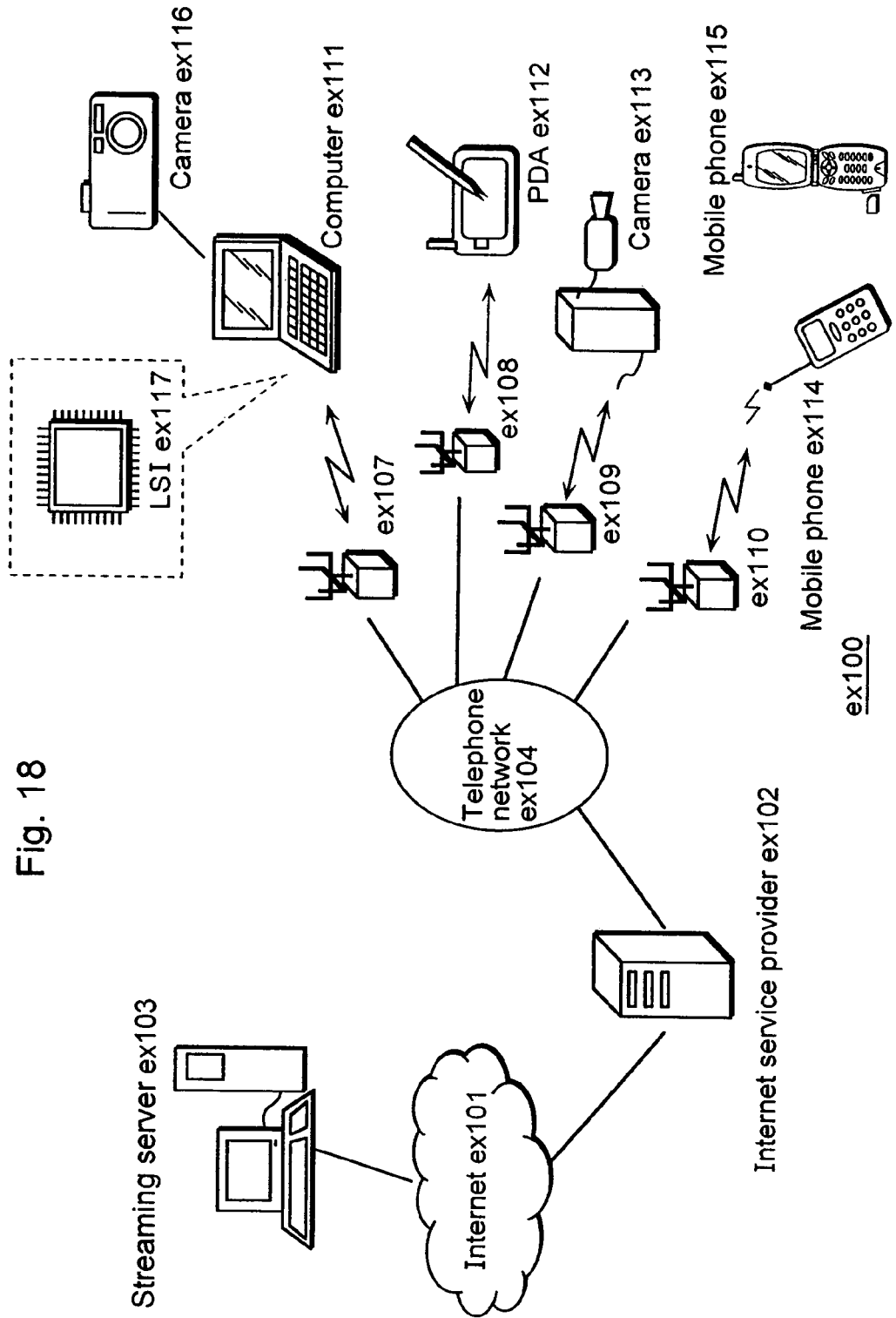
Fig. 18

Fig. 19
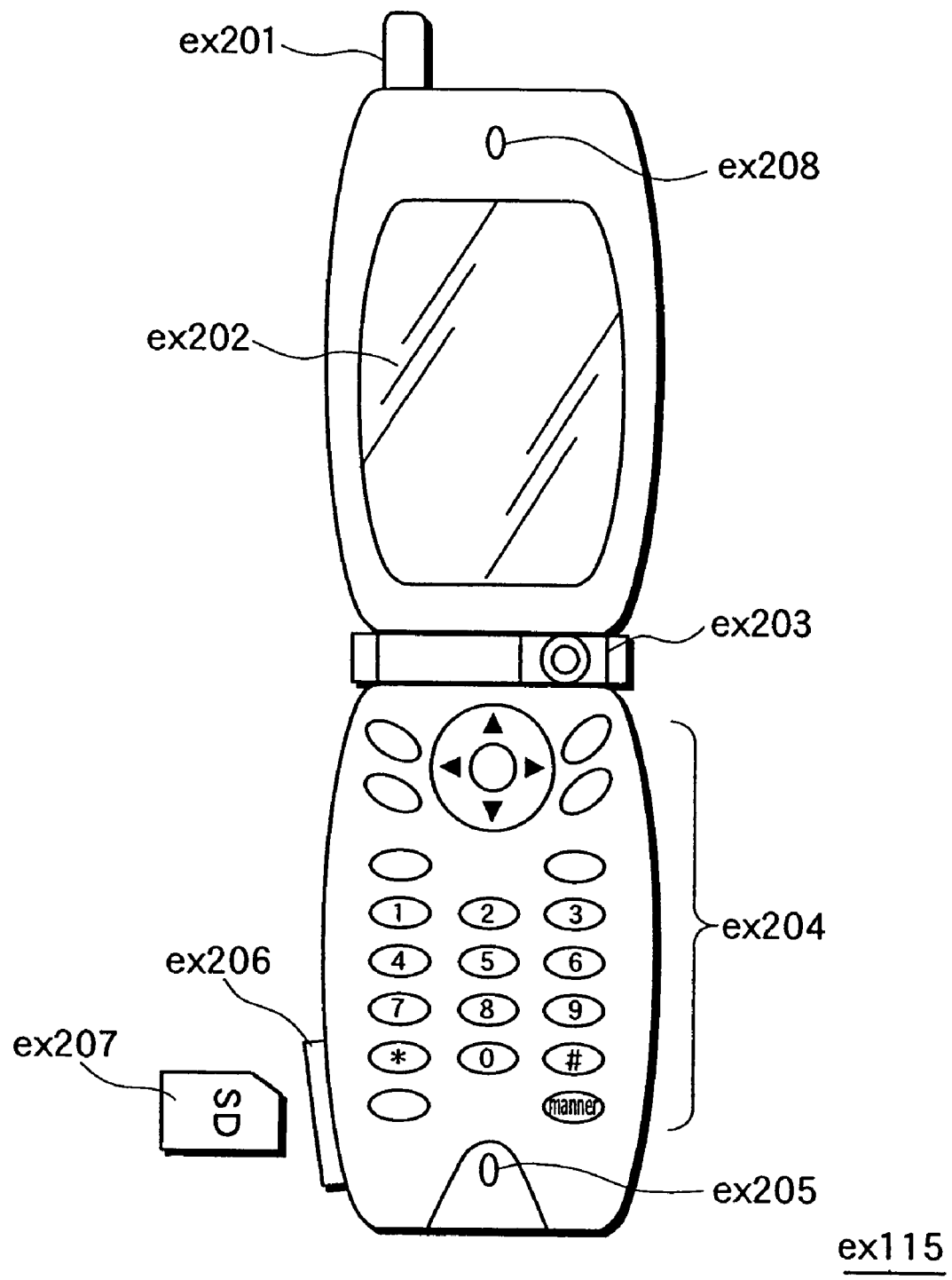

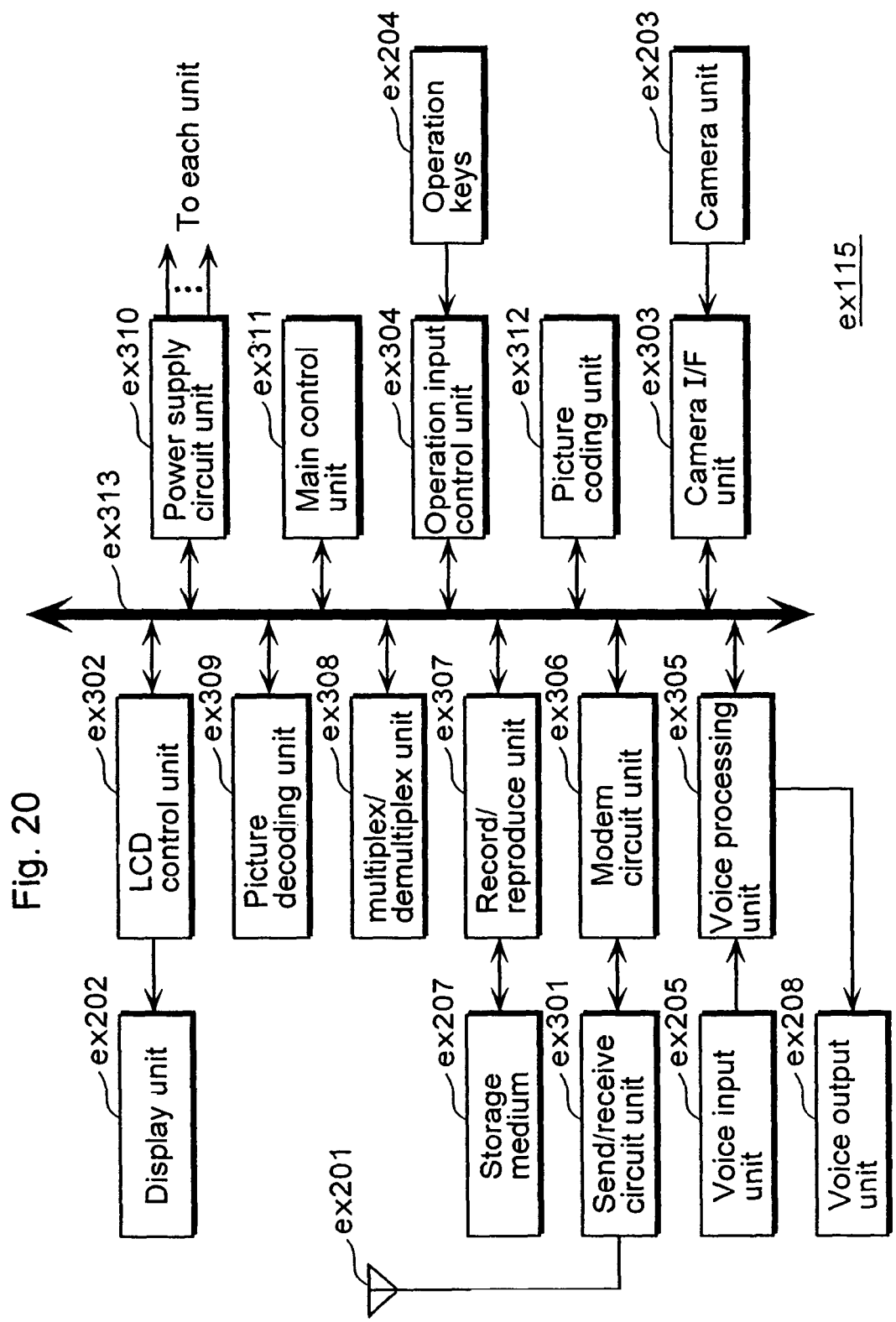
Fig. 20

Fig. 21
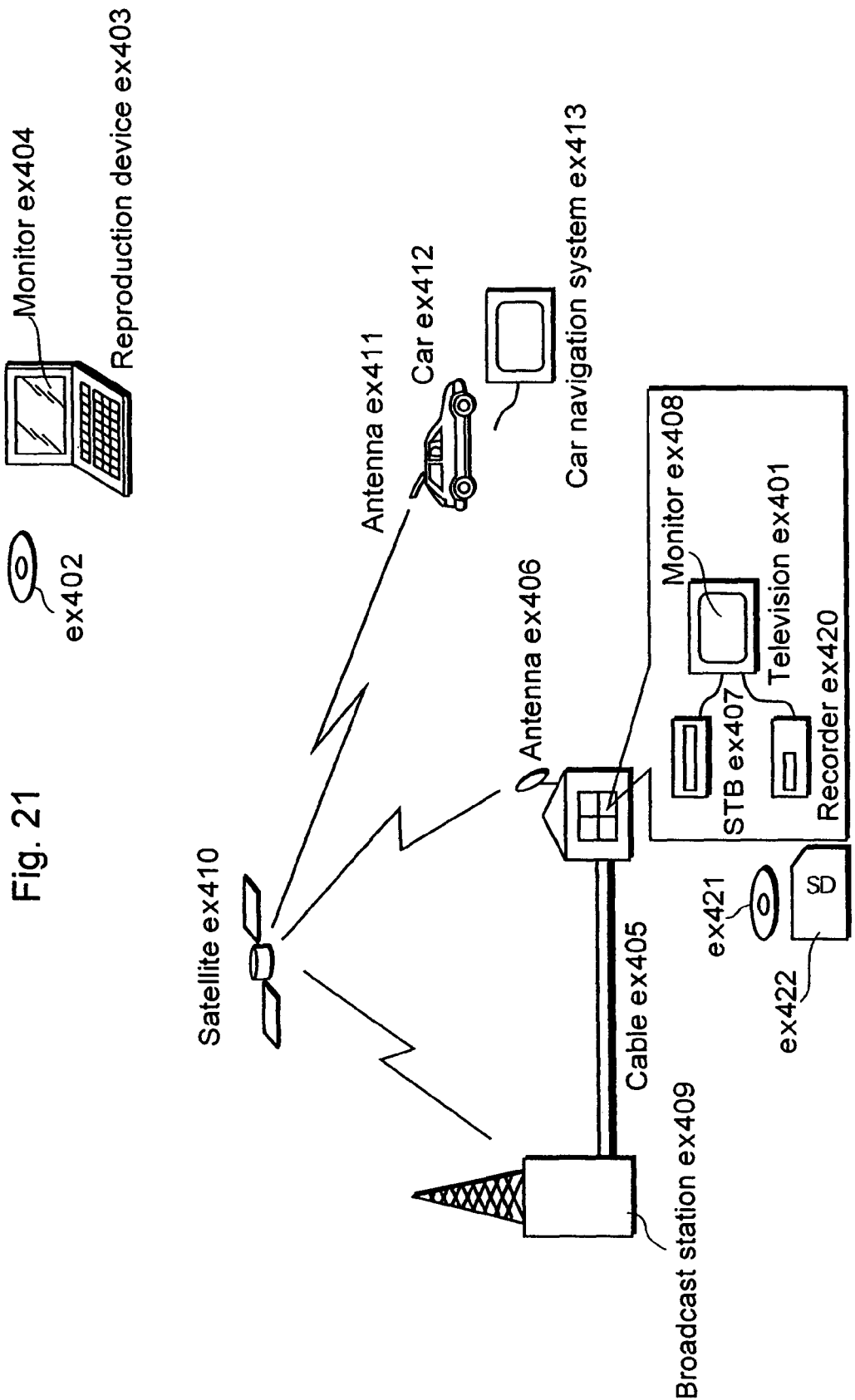

MOVING PICTURE CODING METHOD AND MOVING PICTURE DECODING METHOD FOR PERFORMING INTER PICTURE PREDICTION CODING AND INTER PICTURE PREDICTION DECODING USING PREVIOUSLY PROCESSED PICTURES AS REFERENCE PICTURES

This application is a divisional application of application Ser. No. 10/468,119, filed Aug. 15, 2003, now U.S. Pat. No. 7,664,180 which is the National Stage of International Application No. PCT/JP03/02099, filed Feb. 26, 2003.

TECHNICAL FIELD

The present invention relates to moving picture coding methods and moving picture decoding methods, and particularly to methods for performing inter picture prediction coding and inter picture prediction decoding of a current picture using previously processed pictures as reference pictures.

BACKGROUND ART

In moving picture coding, data amount is generally compressed by utilizing the spatial and temporal redundancies that exist within a moving picture. Generally speaking, frequency transformation is used as a method utilizing the spatial redundancies, and inter picture prediction coding is used as a method utilizing the temporal redundancies. In the inter picture prediction coding, for coding a current picture, previously coded pictures earlier or later than the current picture in display order are used as reference pictures. The amount of motion of the current picture from the reference picture is estimated, and the difference between the picture data obtained by motion compensation based on that amount of motion and the picture data of the current picture is calculated, so that the temporal redundancies are eliminated. The spatial redundancies are further eliminated from this differential value so as to compress the data amount of the current picture.

In the moving picture coding method called H.264 which has been developed for standardization, a picture which is coded not using inter picture prediction but using intra picture coding is referred to as an I-picture, a picture which is coded using inter picture prediction with reference to one previously processed picture which is earlier or later than a current picture in display order is referred to as a P-picture, and a picture which is coded using inter picture prediction with reference to two previously processed pictures which are earlier or later than a current picture in display order is referred to as a B-picture (See ISO/IEC 14496-2 "Information technology—Coding of audio-visual objects—Part2: Visual" pp. 218-219).

FIG. 1A is a diagram showing relationship between respective pictures and the corresponding reference pictures in the above-mentioned moving picture coding method, and FIG. 1B is a diagram showing the sequence of the pictures in the bit stream generated by coding.

A picture I1 is an I-picture, pictures P5, P9 and P13 are P-pictures, and pictures B2, B3, B4, B6, B7, B8, B10, B11 and B12 are B-pictures. As shown by the arrows, the P-pictures P5, P9 and P13 are coded using inter picture prediction from the I-picture I1 and P-pictures P5 and P9 respectively as reference pictures.

As shown by the arrows, the B-pictures B2, B3 and B4 are coded using inter picture prediction from the I-picture I1 and P-picture P5 respectively as reference pictures. In the same manner, the B-pictures B6, B7 and B8 are coded using the P-pictures P5 and P9 respectively as reference pictures, and the B-pictures B10, B11 and B12 are coded using the P-pictures P9 and P13 respectively as reference pictures.

In the above-mentioned coding, the reference pictures are coded prior to the pictures which refer to the reference pictures. Therefore, the bit stream is generated by the above coding in the sequence as shown in FIG. 1B.

By the way, in the H.264 moving picture coding method, a coding mode called direct mode can be selected. An inter picture prediction method in direct mode will be explained with reference to FIG. 2. FIG. 2 is an illustration showing motion vectors in direct mode, and particularly showing the case of coding a block a in the picture B6 in direct mode. In this case, a motion vector c used for coding a block b in the picture P9 is utilized. The block b is co-located with the block a and the picture P9 is a backward reference picture of the picture B6. The motion vector c is a vector used for coding the block b and refers to the picture P5. The block a is coded using bi-prediction based on the reference blocks obtained from the forward reference picture P5 and the backward reference picture P9 using vectors parallel to the motion vector c. In other words, the motion vectors used for coding the block a are the motion vector d for the picture P5 and the motion vector e for the picture P9.

However, when B-pictures are coded using inter picture prediction with reference to I and P-pictures, the temporal distance between the current B-picture and the reference picture may be long, which causes reduction of coding efficiency. Particularly when a lot of B-pictures are located between adjacent I-picture and P-picture or two P-pictures closest to each other, coding efficiency is significantly reduced.

The present invention has been conceived in order to solve the above-mentioned problem, and it is an object of the present invention to provide a moving picture coding method and a moving picture decoding method for avoiding efficiency reduction of coding B-pictures if a lot of B-pictures are located between an I-picture and a P-picture or between two P-pictures. In addition, it is another object to provide a moving picture coding method and a moving picture decoding method for improving coding efficiency in direct mode.

DISCLOSURE OF INVENTION

In order to achieve above-mentioned object, the moving picture coding method of the present invention is a moving picture coding method for coding picture data corresponding to pictures that form a moving picture and generating a bit stream, the moving picture coding method comprising: a coding step for coding a current picture as one of an I-picture, a P-picture and a B-picture, the I-picture having only blocks which are intra picture coded, the P-picture having a block which is inter picture prediction coded with uni-predictive reference using a previously coded picture as a first reference picture, and the B-picture having a block which is inter picture prediction coded with bi-predictive reference using previously coded pictures as a first reference picture and a second reference picture, wherein the coding step includes a control step for determining coding order which is different from display order for consecutive B-pictures located between I-pictures and P-pictures.

Therefore, since B-pictures can be coded using pictures which are temporally closer in display order as reference pictures, prediction efficiency for motion compensation is improved and thus coding efficiency can be increased.

Also, the moving picture coding method according to the present invention is a moving picture coding method for coding picture data corresponding to pictures that form a moving picture and generating a bit stream, the moving picture coding method comprising: a coding step for coding a current picture as a B-picture having a block which is inter picture prediction coded with bi-predictive reference using previously coded pictures as a first reference picture and a second reference picture, wherein in the coding step, when a current block A in a current B-picture is coded in direct mode by which motion compensation of the current block A is performed using motion vectors of the current block A obtained from a motion vector of a previously coded block, the motion vectors for performing the motion compensation of the current block A are obtained by scaling a first motion vector, based on a first reference picture, of a co-located block B in the second reference picture of the current block A, using a difference specified by information indicating display order of pictures.

Therefore, when the direct mode is selected, since a first motion vector of a second reference picture is scaled, there is no need to add motion vector information to a bit stream, and prediction efficiency can also be improved.

Likewise, when a current block A in a current B-picture is coded in direct mode, the motion vectors for performing the motion compensation of the current block A may be obtained by scaling a second motion vector, based on a second reference picture, of a co-located block B in the second reference picture of the current block A, using a difference specified by information indicating display order of pictures.

Therefore, when the direct mode is selected, since a second motion vector of a second reference picture is scaled, there is no need to add motion vector information to a bit stream, and prediction efficiency can also be improved.

Furthermore, when a current block A in a current B-picture is coded in direct mode, if a co-located block B in the second reference picture of the current block A is previously coded in direct mode, the motion vectors for performing the motion compensation of the current block A may be obtained by scaling a first motion vector, based on a first reference picture of the block B, substantially used for coding the block B in the second reference picture, using a difference specified by information indicating display order of pictures.

Therefore, when the direct mode is selected, since a first motion vector of a second reference picture which has been substantially used for coding the second reference picture is scaled, there is no need to add motion vector information to a bit stream, and prediction efficiency can also be improved.

Also, when a current block A in a current B-picture is coded in direct mode, the motion vectors for performing the motion compensation of the current block A may be obtained by scaling a first motion vector, based on a first reference picture, of a co-located block B in a temporally later P-picture, using a difference specified by information indicating display order of pictures.

Therefore, when the direct mode is selected, since a first motion vector of a temporally later P-picture is scaled, there is no need to add motion vector information to a bit stream, and prediction efficiency can also be improved.

Furthermore, when a current block A in a current B-picture is coded in direct mode, the motion vectors for performing the motion compensation of the current block A may be obtained by scaling a first motion vector if a co-located block B in the second reference picture of the current block A is coded using at least the first motion vector based on a first reference picture of the block B, and scaling a second motion vector if the block B is coded using only the second motion vector based on a second reference picture of the block B, using a difference specified by information indicating display order of pictures.

Therefore, when the direct mode is selected, if a second reference picture has a first motion vector, this first motion vector is scaled, and if the second reference picture does not have a first motion vector but only a second motion vector, this second motion vector is scaled. So, there is no need to add motion vector information to a bit stream, and prediction efficiency can be improved.

In addition, the moving picture decoding method according to the present invention is a moving picture decoding method for decoding a bit stream which is generated by coding picture data corresponding to pictures that form a moving picture, the moving picture decoding method comprising: a decoding step for decoding a current picture by inter picture prediction using a previously decoded picture as a reference picture, wherein in the decoding step, when the current picture is decoded by the inter picture prediction with bi-predictive reference using the previously decoded pictures as a first reference picture and a second reference picture, a bit stream including at least a picture which is temporally closest to the current picture in display order, as the first reference picture or the second reference picture, is decoded.

Therefore, a bit stream, which is generated by coding a picture by inter picture prediction with bi-predictive reference using pictures which are temporally close in display order as a first reference picture and a second reference picture, can be properly decoded.

Also, the moving picture decoding method according to the present invention is a moving picture decoding method for decoding a bit stream which is generated by coding picture data corresponding to pictures that form a moving picture, the moving picture decoding method comprising: a decoding step for decoding a current picture by inter picture prediction using a previously decoded picture as a reference picture, wherein in the decoding step, when the current picture is a picture having a block which is decoded by inter picture prediction with bi-predictive reference using previously decoded pictures as a first reference picture and a second reference picture, and a current block A is decoded in direct mode by which motion compensation of the current block A is performed using motion vectors of the current block A obtained from a motion vector of a previously decoded block, the motion vectors for performing the motion compensation of the current block A are obtained by scaling a first motion vector, based on a first reference picture, of a co-located block B in the second reference picture of the current block A, using a difference specified by information indicating display order of pictures.

Therefore, when the direct mode is selected, since a first motion vector of a second reference picture is scaled, proper decoding can be achieved.

Likewise, when a current picture is a picture having a block which is decoded by inter picture prediction with bi-predictive reference and a current block A is decoded in direct mode, the motion vectors for performing the motion compensation of the current block A may be obtained by scaling a second motion vector, based on a second reference picture, of a co-located block B in the second reference picture of the current block A, using a difference specified by information indicating display order of pictures.

Therefore, when the direct mode is selected, since a second motion vector of a second reference picture is scaled, proper decoding can be achieved.

Furthermore, when a current picture is a picture having a block which is decoded by inter picture prediction with bi-predictive reference and a current block A is decoded in direct mode, if a co-located block B in the second reference picture of the current block A is previously decoded in direct mode, the motion vectors for performing the motion compensation of the current block A may be obtained by scaling a first motion vector, based on a first reference picture of the block B, substantially used for decoding the block B in the second reference picture, using a difference specified by information indicating display order of pictures.

Therefore, when the direct mode is selected, since a first motion vector of a second reference picture which has been substantially used for decoding the second reference picture is scaled, proper decoding can be achieved.

Also, when a current picture is a picture having a block which is decoded by inter picture prediction with bi-predictive reference and a current block A is decoded in direct mode, the motion vectors for performing the motion compensation of the current block A may be obtained by scaling a first motion vector, based on a first reference picture, of a co-located block B in a temporally later picture, using a difference specified by information indicating display order of pictures, the later picture being inter picture prediction decoded with uni-predictive reference using a previously decoded picture as a first reference picture.

Therefore, when the direct mode is selected, since a first motion vector of a picture which is decoded by inter picture prediction with uni-predictive reference is scaled, proper decoding can be achieved.

The present invention can be realized as such a moving picture coding method and a moving picture decoding method as mentioned above, but also as a moving picture coding apparatus and a moving picture decoding apparatus including characteristic steps of these moving picture coding method and moving picture decoding method. In addition, the present invention can be realized as a bit stream obtained by coding by the moving picture coding method so as to distribute it via a recording medium such as a CD-ROM or a transmission medium such as the Internet.

BRIEF DESCRIPTION OF DRAWINGS

FIG. 1 is a schematic diagram showing prediction relations between pictures and their sequence in the conventional moving picture coding method, and 1A shows the relations between respective pictures and the corresponding reference pictures, and FIG. 1B shows the sequence of the pictures in a bit stream generated by coding.

FIG. 2 is a schematic diagram showing motion vectors in direct mode in the conventional moving picture coding method.

FIG. 3 is a block diagram showing the structure of a first embodiment of a moving picture coding apparatus using a moving picture coding method according to the present invention.

FIG. 4 is an illustration of picture numbers and relative indices in the embodiments of the present invention.

FIG. 5 is a conceptual illustration of a moving picture coded data format in the moving picture coding apparatus in the embodiments of the present invention.

FIG. 6 is an illustration showing the picture sequence in a reordering memory in the embodiments of the present invention, and FIG. 6A shows the sequence in input order, and FIG. 6B shows the reordered sequence.

FIG. 7 is a schematic diagram showing motion vectors in direct mode in the embodiments of the present invention, and FIG. 7A shows a case where a current block a is a picture B7, FIG. 7B shows first and second examples in a case where a current block a is a picture B6, FIG. 7C shows a third example in a case where a current block a is a picture B6, and FIG. 7D shows a fourth example in a case where a current block a is a picture B6.

FIG. 8 is a schematic diagram showing motion vectors in direct mode in the embodiments of the present invention, and FIG. 8A shows a fifth example in a case where a current block a is a picture B6, FIG. 8B shows a sixth example in a case where a current block a is a picture B6, FIG. 8C shows a seventh example in a case where a current block a is a picture B6, and FIG. 8D shows a case where a current block a is a picture B8.

FIG. 9 is a schematic diagram showing prediction relations between respective pictures and their sequence in the embodiments of the present invention, and FIG. 9A shows the prediction relations between respective pictures indicated in display order, and FIG. 9B shows the sequence of the pictures reordered in coding order (in a bit stream).

FIG. 10 is a schematic diagram showing prediction relations between respective pictures and their sequence in the embodiments of the present invention, and FIG. 10A shows the prediction relations between respective pictures indicated in display order, and FIG. 10B shows the sequence of the pictures reordered in coding order (in a bit stream).

FIG. 11 is a schematic diagram showing prediction relations between respective pictures and their sequence in the embodiments of the present invention, and FIG. 11A shows the prediction relations between respective pictures indicated in display order, and FIG. 11B shows the sequence of the pictures reordered in coding order (in a bit stream).

FIG. 12 is a schematic diagram showing hierarchically the picture prediction structure as shown in FIG. 6 in the embodiments of the present invention.

FIG. 13 is a schematic diagram showing hierarchically the picture prediction structure as shown in FIG. 9 in the embodiments of the present invention.

FIG. 14 is a schematic diagram showing hierarchically the picture prediction structure as shown in FIG. 10 in the embodiments of the present invention.

FIG. 15 is a schematic diagram showing hierarchically the picture prediction structure as shown in FIG. 11 in the embodiments of the present invention.

FIG. 16 is a block diagram showing the structure of an embodiment of a moving picture decoding apparatus using a moving picture decoding method according to the present invention.

FIG. 17 is an illustration of a recording medium for storing a program for realizing the moving picture coding method and the moving picture decoding method in the first and second embodiments by a computer system, and FIG. 17A shows an example of a physical format of a flexible disk as a body of recording medium, FIG. 17B shows a cross-sectional view and a front view of the appearance of the flexible disk and the flexible disk itself, FIG. 17C shows a structure for recording and reproducing the program on the flexible disk FD.

FIG. 18 a block diagram showing the overall configuration of a content supply system for realizing content distribution service.

FIG. 19 is a sketch showing an example of a mobile phone.

FIG. 20 is a block diagram showing the internal structure of the mobile phone.

FIG. 21 is a block diagram showing the overall configuration of a digital broadcast system.

BEST MODE FOR CARRYING OUT THE INVENTION

The embodiments of the present invention will be explained below with reference to the figures.

First Embodiment

FIG. 3 is a block diagram showing the structure of an embodiment of the moving picture coding apparatus using the moving picture coding method according to the present invention.

As shown in FIG. 3, the moving picture coding apparatus includes a reordering memory 101, a difference calculation unit 102, a residual error coding unit 103, a bit stream generation unit 104, a residual error decoding unit 105, an addition unit 106, a reference picture memory 107, a motion vector estimation unit 108, a mode selection unit 109, a coding control unit 110, switches 111~115 and a motion vector storage unit 116.

The reordering memory 101 stores moving pictures inputted on a picture-to-picture basis in display order. The coding control unit 110 reorders the pictures stored in the reordering memory 101 in coding order. The coding control unit 110 also controls the operation of the motion vector storage unit 116 for storing motion vectors.

Using the previously coded and decoded picture data as a reference picture, the motion vector estimation unit 108 estimates a motion vector indicating a position which is predicted optimum in the search area in the reference picture. The mode selection unit 109 determines a mode for coding macroblocks using the motion vector estimated by the motion vector estimation unit 108, and generates predictive image data based on the coding mode. The difference calculation unit 102 calculates the difference between the image data read out from the reordering memory 101 and the predictive image data inputted by the mode selection unit 109, and generates residual error image data.

The residual error coding unit 103 performs coding processing such as frequency transform and quantization on the inputted residual error image data for generating the coded data. The bit stream generation unit 104 performs variable length coding or the like on the inputted coded data, and further adds the motion vector information, the coding mode information and other relevant information inputted by the mode selection unit 109 to the coded data so as to generate a bit stream.

The residual error decoding unit 105 performs decoding processing such as inverse quantization and inverse frequency transform on the inputted coded data for generating decoded differential image data. The addition unit 106 adds the decoded differential image data inputted by the residual error decoding unit 105 and the predictive image data inputted by the mode selection unit 109 for generating decoded image data. The reference picture memory 107 stores the generated decoded image data.

FIG. 4 is an illustration of pictures and relative indices. The relative indices are used for identifying uniquely reference pictures stored in the reference picture memory 107, and they are associated to respective pictures as shown in FIG. 4. The relative indices are also used for indicating the reference pictures which are to be used for coding blocks using inter picture prediction.

FIG. 5 is a conceptual illustration of moving picture coded data format used by the moving picture coding apparatus. Coded data "Picture" for one picture includes header coded data "Header" included in the head of the picture, block coded data "Block1" for direct mode, block coded data "Block2" for the inter picture prediction other than the direct mode, and the like. The block coded data "Block2" for the inter picture prediction other than direct mode has a first relative index "RIdx1" and a second relative index "RIdx2" for indicating two reference pictures used for inter picture prediction, a first motion vector "MV1" and a second motion vector "MV2" in this order. On the other hand, the block coded data "Block1" for direct mode does not have the first and second relative indices "RIdx1" and "RIdx2" and the first and second motion vectors "MV1" and "MV2". The index which is to be used, the first relative index "RIdx1" or the second relative index "RIdx2", can be determined by the prediction type "PredType". Also, the first relative index "RIdx1" indicates a first reference picture, and the second relative index "RIdx2" indicates a second reference picture. In other words, whether a picture is a first reference picture or a second reference picture is determined based on where they are located in the bit stream.

Note that a P-picture is coded by inter picture prediction with uni-predictive reference using a previously coded picture which is located earlier or later in display order as a first reference picture, and a B-picture is coded by inter picture prediction with bi-predictive reference using previously coded pictures which are located earlier or later in display order as a first reference picture and a second reference picture. In the first embodiment, the first reference picture is explained as a forward reference picture, and the second reference picture is explained as a backward reference picture. Furthermore, the first and second motion vectors for the first and second reference pictures are explained as a forward motion vector and a backward motion vector respectively.

Next, how to assign the first and second relative indices will be explained with reference to FIG. 4A.

As the first relative indices, in the information indicating display order, the values incremented by 1 from 0 are first assigned to the reference pictures earlier than the current picture from the picture closer to the current picture. After the values incremented by 1 from 0 are assigned to all the reference pictures earlier than the current picture, then the subsequent values are assigned to the reference pictures later than the current picture from the picture closer to the current picture.

As the second relative indices, in the information indicating display order, the values incremented by 1 from 0 are assigned to the reference pictures later than the current picture from the picture closer to the current picture. After the values incremented by 1 from 0 are assigned to all the reference pictures later than the current picture, then the subsequent values are assigned to the reference pictures earlier than the current picture from the picture closer to the current picture.

For example, in FIG. 4A, when the first relative index "RIdx1" is 0 and the second relative index "RIdx2" is 1, the forward reference picture is the B-picture No. 6 and the backward reference picture is the P-picture No. 9. Here, these picture numbers 6 and 9 indicate the display order.

Relative indices in a block are represented by variable length code words, and the codes with shorter lengths are assigned to the indices of the smaller values. Since the picture which is closest to the current picture is usually selected as a reference picture for inter picture prediction, coding efficiency is improved by assigning the relative index values in order of closeness to the current picture.

Assignment of reference pictures to relative indices can be changed arbitrarily if it is explicitly indicated using buffer control signal in coded data (RPSL in Header as shown in FIG. 5). This enables to change the reference picture with the second relative index "0" to an arbitrary reference picture in the reference picture memory 107. As shown in FIG. 4B, assignment of reference indices to pictures can be changed, for example.

Next, the operation of the moving picture coding apparatus structured as above will be explained below.

FIG. 6 is an illustration showing the picture sequence in the reordering memory 101, and FIG. 6A shows the sequence in input order and FIG. 6B shows the reordered sequence. Here, vertical lines show pictures, and the numbers indicated at the lower right of the pictures show the picture types (I, P and B) with the first alphabetical letters and the picture numbers indicating display order with the following numbers.

As shown in FIG. 6A, a moving picture is inputted to the reordering memory 101 on a picture-to-picture basis in display order, for example. When the pictures are inputted to the reordering memory 101, the coding control unit 110 reorders the pictures inputted to the reordering memory 101 in coding order. The pictures are reordered based on the reference relations in inter picture prediction coding, and more specifically, the pictures are reordered so that the pictures used as reference pictures are coded earlier than the pictures which use the reference pictures.

Here, it is assumed that a P-picture refers to one neighboring previously processed I or P-picture which is located earlier or later than the current P-picture in display order, and a B-picture refers to two neighboring previously processed pictures which are located earlier or later than the current B-picture in display order.

The pictures are coded in the following order. First, a B-picture at the center of B-pictures (3 B-pictures in FIG. 6A, for instance) located between two P-pictures is coded, and then another B-picture closer to the earlier P-picture is coded. For example, the pictures B6, B7, B8 and P9 are coded in the order of P9, B7, B6 and B8.

In this case, in FIG. 6A, the picture pointed by the arrow refers to the picture at the origin of the arrow. Specifically, B-picture B7 refers to P-pictures P5 and P9, B6 refers to P5 and B7, and B8 refers to B7 and P9, respectively. The coding control unit 110 reorders the pictures in coding order, as shown in FIG. 6B.

Next, the pictures reordered in the reordering memory 101 are read out in a unit for every motion compensation. Here, the unit of motion compensation is referred to as a macroblock which is 16 (horizontal)×16 (vertical) pixels in size. Coding of the pictures P9, B7 B6 and B8 shown in FIG. 6A will be explained below in this order.

(Coding of Picture P9)

The P-picture P9 is coded using inter picture prediction with reference to one previously processed picture located earlier or later than P9 in display order. In coding P9, the picture P5 is the reference picture, as mentioned above. P5 has already been coded and the decoded picture thereof is stored in the reference picture memory 107. In coding P-pictures, the coding control unit 110 controls switches 113, 114 and 115 so as to be ON. The macroblocks in the picture P9 read out from the reordering memory 101 are thus inputted to the motion vector estimation unit 108, the mode selection unit 109 and the difference calculation unit 102 in this order.

The motion vector estimation unit 108 estimates a motion vector of a macroblock in the picture P9, using the decoded picture data of the picture P5 stored in the reference picture memory 107 as a reference picture, and outputs the estimated motion vector to the mode selection unit 109.

The mode selection unit 109 determines the mode for coding the macroblock in the picture P9 using the motion vector estimated by the motion vector estimation unit 108. Here, the coding mode indicates the method of coding macroblocks. As for P-pictures, it determines any of the coding methods, intra picture coding, inter picture prediction coding using a motion vector and inter picture prediction coding without using a motion vector (where motion is handled as "0"). For determining a coding mode, a method is selected so that a coding error is reduced with a small amount of bits.

The mode selection unit 109 outputs the determined coding mode to the bit stream generation unit 104. If the coding mode determined by the mode selection unit 109 is inter picture prediction coding, the motion vector which is to be used for the inter picture prediction coding is outputted to the bit stream generation unit 104 and further stored in the motion vector storage unit 116.

The mode selection unit 109 generates predictive image data based on the determined coding mode for generating to the difference calculation unit 102 and the addition unit 106. However, when selecting intra picture coding, the mode selection unit 109 does not output predictive image data. In addition, when selecting intra picture coding, the mode selection unit 109 controls the switches 111 and 112 to connect to "a" side and "c" side respectively, and when selecting inter picture prediction coding, it controls them to connect to "b" side and "d" side respectively. The case will be explained below where the mode selection unit 109 selects inter picture prediction coding.

The difference calculation unit 102 receives the image data of the macroblock in the picture P9 read out from the reordering memory 101 and the predictive image data outputted from the mode selection unit 109. The difference calculation unit 102 calculates the difference between the image data of the macroblock in the picture P9 and the predictive image data, and generates the residual error image data for outputting to the residual error coding unit 103.

The residual error coding unit 103 performs coding processing such as frequency transform and quantization on the inputted residual error image data and thus generates the coded data for outputting to the bit stream generation unit 104 and the residual error decoding unit 105. Here, the coding processing such as frequency transform and quantization is performed in every 8 (horizontal)×8 (vertical) pixels or 4 (horizontal)×4 (vertical) pixels, for example.

The bit stream generation unit 104 performs variable length coding or the like on the inputted coded data, and further adds information such as motion vectors and a coding mode, header information and so on to the coded data for generating and outputting the bit stream.

On the other hand, the residual error decoding unit 105 performs decoding processing such as inverse quantization and inverse frequency transform on the inputted coded data and generates the decoded differential image data for outputting to the addition unit 106. The addition unit 106 adds the decoded differential image data and the predictive image data inputted by the mode selection unit 109 for generating the decoded image data, and stores it in the reference picture memory 107.

That is the completion of coding one macroblock in the picture P9. According to the same processing, the remaining macroblocks of the picture P9 are coded. And after all the macroblocks of the picture P9 are coded, the picture B7 is coded.

(Coding of Picture B7)

The picture B7 refers to the picture P5 as a forward reference picture and the picture P9 as a backward reference picture. Since the picture B7 is used as a reference picture for coding other pictures, the coding control unit 110 controls the switches 113, 114 and 115 so as to be ON, which causes the macroblocks in the picture B7 read out from the reordering memory 101 to be inputted to the motion vector estimation unit 108, the mode selection unit 109 and the difference calculation unit 102.

Using the decoded picture data of the picture P5 and the decoded picture data of the picture P9 which are stored in the reference picture memory 107 as a forward reference picture and a backward reference picture respectively, the motion vector estimation unit 108 estimates a forward motion vector and a backward motion vector of the macroblock in the picture B7. And the motion vector estimation unit 108 outputs the estimated motion vectors to the mode selection unit 109.

The mode selection unit 109 determines the coding mode for the macroblock in the picture B7 using the motion vectors estimated by the motion vector estimation unit 108. Here, it is assumed that a coding mode for B-pictures can be selected from among intra picture coding, inter picture prediction coding using a forward motion vector, inter picture prediction coding using a backward motion vector, inter picture prediction coding using bi-predictive motion vectors and direct mode.

Operation of direct mode coding will be explained with reference to FIG. 7A. FIG. 7A is an illustration showing motion vectors in direct mode, and specifically shows the case where the block a in the picture B7 is coded in direct mode. In this case, a motion vector c, which has been used for coding the block b in the picture P9, is utilized. The block b is co-located with the block a, and the picture P9 is a backward reference picture of the picture B7. The motion vector c is stored in the motion vector storage unit 116. The block a is bi-predicted from the forward reference picture P5 and the backward reference picture P9 using vectors obtained utilizing the motion vector c. For example, as a method of utilizing the motion vector c, there is a method of generating motion vectors parallel to the motion vector c. In this case, the motion vector d and the motion vector e are used for the picture P5 and the picture P9 respectively for coding the block a.

In this case where the forward motion vector d is MVF, the backward motion vector e is MVB, the motion vector c is MV, the temporal distance between the backward reference picture P9 for the current picture B7 and the picture P5 which the block in the backward reference picture P9 refers to is TRD, and the temporal distance between the current picture B7 and the forward reference picture P5 is TRF respectively, the motion vector d MVF and the motion vector e MVB are respectively calculated by Equation 1 and Equation 2. Note that the temporal distance between the pictures can be determined based on the information indicating the display order (position) given to the respective pictures or the difference specified by the information.

$$MVF = MV \times TRF/TRD \quad \text{Equation 1}$$

$$MVB = (TRF - TRD) \times MV/TRD \quad \text{Equation 2}$$

where MVF and MVB respectively represent horizontal components and vertical components of the motion vectors, and the plus and minus signs indicate directions of the motion vectors.

By the way, as for selection of a coding mode, a method for reducing coding error with a smaller amount of bits is generally selected. The mode selection unit 109 outputs the determined coding mode to the bit stream generation unit 104. If the coding mode determined by the mode selection unit 109 is inter picture prediction coding, the motion vectors used for the inter picture prediction coding is outputted to the bit stream generation unit 104 and further stored in the motion vector storage unit 116. When the direct mode is selected, the motion vectors which are calculated according to Equation 1 and Equation 2 and used for direct mode are stored in the motion vector storage unit 116.

The mode selection unit 109 also generates predictive image data based on the determined coding mode for outputting to the difference calculation unit 102 and the addition unit 106, although it does not output the predictive image data if it selects the intra picture coding. In addition, when selecting the intra picture coding, the mode selection unit 109 controls the switches 111 and 112 to connect to "a" side and "c" side respectively, and when selecting the inter picture prediction coding or direct mode, it controls the switches 111 and 112 to connect to "b" side and "d" side respectively. The case will be explained below where the mode selection unit 109 selects the inter picture prediction coding or the direct mode.

The difference calculation unit 102 receives the image data of the macroblock of the picture B7 read out from the reordering memory 101 and the predictive image data outputted from the mode selection unit 109. The difference calculation unit 102 calculates the difference between the image data of the macroblock of the picture B7 and the predictive image data, and generates the residual error image data for outputting to the residual error coding unit 103.

The residual error coding unit 103 performs coding processing such as frequency transform and quantization on the inputted residual error image data and thus generates the coded data for outputting to the bit stream generation unit 104 and the residual error decoding unit 105.

The bit stream generation unit 104 performs variable length coding or the like on the inputted coded data, and further adds information such as motion vectors and a coding mode and so on to that data for generating and outputting a bit stream.

On the other hand, the residual error decoding unit 105 performs decoding processing such as inverse quantization and inverse frequency transform on the inputted coded data and generates the decoded differential image data for outputting to the addition unit 106. The addition unit 106 adds the decoded differential image data and the predictive image data inputted by the mode selection unit 109 for generating the decoded image data, and stores it in the reference picture memory 107.

That is the completion of coding one macroblock in the picture B7. According to the same processing, the remaining macroblocks in the picture B7 are coded. And after all the macroblocks of the picture B7 are coded, the picture B6 is coded.

(Coding of Picture B6)

Since the picture B6 is a B-picture, B6 is coded using inter picture prediction with reference to two previously processed pictures located earlier or later than B6 in display order. The B-picture B6 refers to the picture P5 as a forward reference picture and the picture B7 as a backward reference picture, as described above. Since the picture B6 is not used as a reference picture for coding other pictures, the coding control unit 110 controls the switch 113 to be ON and the switches 114 and 115 to be OFF, which causes the macroblock of the picture B6 read out from the reordering memory 101 to be inputted to the motion vector estimation unit 108, the mode selection unit 109 and the difference calculation unit 102.

Using the decoded picture data of the picture P5 and the decoded picture data of the picture B7 which are stored in the reference picture memory 107 as a forward reference picture and a backward reference picture respectively, the motion vector estimation unit 108 estimates the forward motion vector and the backward motion vector for the macroblock in the picture B6. And the motion vector estimation unit 108 outputs the estimated motion vectors to the mode selection unit 109.

The mode selection unit 109 determines the coding mode for the macroblock in the picture B6 using the motion vectors estimated by the motion vector estimation unit 108.

Here, the first example of direct mode coding operation for the macroblock in the picture B6 will be explained with reference to FIG. 7B. FIG. 7B is an illustration showing motion vectors in direct mode, and specifically showing the case where the block a in the picture B6 is coded in direct mode. In this case, a motion vector c, which has been used for coding a block b in the picture B7 is utilized. The block b is co-located with the block a, and the picture B7 is a backward reference picture of the picture B6. Here, it is assumed that the block b is coded by forward reference only or bi-predictive reference and the forward motion vector of the block b is the motion vector c. It is also assumed that the motion vector c is stored in the motion vector storage unit 116. The block a is bi-predicted from the forward reference picture P5 and the backward reference picture B7 using motion vectors generated utilizing the motion vector c. For example, if a method of generating motion vectors parallel to the motion vector c is used, as is the case of the above-mentioned picture B7, the motion vector d and the motion vector e are used for the picture P5 and the picture B7 respectively for coding the block a.

In this case where the forward motion vector d is MVF, the backward motion vector e is MVB, the motion vector c is MV, the temporal distance between the backward reference picture B7 for the current picture B6 and the picture P5 which the block b in the backward reference picture B7 refers to is TRD, and the temporal distance between the current picture B6 and the forward reference picture P5 is TRF respectively, the motion vector d MVF and the motion vector e MVB are respectively calculated by above-mentioned Equation 1 and Equation 2. Note that the temporal distance between the pictures can be determined based on the information indicating display order of the pictures or the difference specified by the information, for instance.

As described above, in direct mode, by scaling the forward motion vector of a backward reference B-picture, there is no need to transmit motion vector information, and motion prediction efficiency can be improved. Accordingly, coding efficiency can be improved. In addition, by using reference pictures temporally closest available in display order as a forward reference picture and a backward reference picture, coding efficiency can be increased.

Next, the second example of the direct mode will be explained with reference to FIG. 7B. In this case, the motion vector, which has been used for coding the block b in the picture B7, is utilized. The block b is co-located with the block a, and the picture B7 is a backward reference picture for the picture B6. Here, it is assumed that the block b has been coded in direct mode and the forward motion vector which has been substantially used for coding the block b is the motion vector c. Specifically, the motion vector c is obtained by scaling the motion vector used for coding a block i, co-located with the block b, in the picture P9 that is the backward reference picture for the picture B7. The motion vector c stored in the motion vector storage unit 116 is used, or the motion vector c is obtained by reading out from the motion vector storage unit 116 the motion vector of the block i in the picture P9 which has been used for coding the block b in direct mode and calculating based on that motion vector. When the motion vector which is obtained by scaling for coding the block b in the picture B7 in direct mode is stored in the motion vector storage unit 116, only the forward motion vector needs to be stored. The block a is bi-predicted from the forward reference picture P5 and the backward reference picture B7 using the motion vectors generated utilizing the motion vector c. For example, if a method of generating motion vectors parallel to the motion vector c is used, as is the case of the above-mentioned first example, motion vectors used for coding the block a are the motion vector d and the motion vector e for the picture P5 and the picture B7 respectively.

In this case, the forward motion vector d MVF and the backward motion vector e MVB of the block a are respectively calculated by above-mentioned Equation 1 and Equation 2, as in the case of the first example.

As described above, in direct mode, since the forward motion vector of a backward reference B-picture which has been substantially used for coding the B-picture in direct mode is scaled, there is no need to transmit the motion vector information, and motion prediction efficiency can be improved even if the co-located block in the backward reference picture has been coded in direct mode. Accordingly, coding efficiency can be improved. In addition, by using reference pictures which are temporally closest available in display order as a forward reference picture and a backward reference picture, coding efficiency can be increased.

Next, the third example of direct mode will be explained with reference to FIG. 7C. FIG. 7C is an illustration showing motion vectors in direct mode, and specifically showing the case where the block a in the picture B6 is coded in direct mode. In this case, the motion vector which has been used for coding the block b in the picture B7 is utilized. The picture B7 is a backward reference picture for the picture B6, and the block b in the picture B7 is co-located with the block a in the picture B6. Here, it is assumed that the block b has been coded using a backward motion vector only and the backward motion vector used for coding the block b is a motion vector f. Specifically, the motion vector f is assumed to be stored in the motion vector storage unit 116. The block a is bi-predicted from the forward reference picture P5 and the backward reference picture B7 using motion vectors generated utilizing the motion vector f. For example, if a method of generating motion vectors parallel to the motion vector f is used, as is the case of the above-mentioned first example, motion vectors used for coding the block a are the motion vector g and the motion vector h for the picture P5 and the picture B7 respectively.

In this case, where the forward motion vector g is MVF, the backward motion vector h is MVB, the motion vector f is MV, the temporal distance between the backward reference picture B7 for the current picture B6 and the picture P9 which the block in the backward reference picture B7 is TRD, the temporal distance between the current picture B6 and the forward reference picture P5 is TRF, and the temporal distance between the current picture B6 and the backward reference picture B7 is TRB respectively, the motion vector g MVF and the motion vector h MVB are respectively calculated by Equation 3 and Equation 4.

$$MVF = -TRF \times MV/TRD \qquad \text{Equation 3}$$

$$MVB = TRB \times MV/TRD \qquad \text{Equation 4}$$

As described above, in direct mode, since the backward motion vector of a co-located block in a backward reference B-picture which has been used for coding the block is scaled, there is no need to transmit motion vector information, and motion prediction efficiency can be improved even if the co-located block in the backward reference picture has only the backward motion vector. Accordingly, the coding efficiency can be improved. In addition, by using reference pictures which are temporally closest available in display order as a forward reference picture and a backward reference picture, coding efficiency can be increased.

Next, the fourth example of direct mode will be explained with reference to FIG. 7D. FIG. 7D is an illustration showing motion vectors in direct mode, and specifically showing the case where the block a in the picture B6 is coded in direct mode. In this case, the motion vector which has been used for coding the block b in the picture B7 is utilized. The picture B7 is the backward reference picture for the picture B6, and the block b is co-located with the block a in the picture B6. Here, it is assumed that the block b has been coded using the backward motion vector only, as is the case of the third example, and the backward motion vector used for coding the block b is the motion vector f. Specifically, the motion vector f is assumed to be stored in the motion vector storage unit 116. The block a is bi-predicted from the reference picture P9 which is referred to by the motion vector f and the backward reference picture B7 using motion vectors generated utilizing the motion vector f. For example if a method of generating motion vectors parallel to the motion vector f is used, as is the case of the above-mentioned first example, motion vectors used for coding the block a are the motion vector g and the motion vector h for the picture P9 and the picture B7 respectively.

In this case, where the forward motion vector g is MVF, the backward motion vector h is MVB, the motion vector f is MV, the temporal distance between the backward reference picture B7 for the current picture B6 and the picture P9 which the block in the backward reference picture B7 refers to is TRD, and the temporal distance between the current picture B6 and the picture P9 which the block b in the backward reference picture B7 refers to is TRF respectively, the motion vector g MVF and the motion vector h MVB are respectively calculated by Equation 1 and Equation 2.

As described above, in direct mode, by scaling the backward motion vector of a co-located block in a backward reference B-picture which has been used for coding the block, there is no need to transmit motion vector information, and motion prediction efficiency can be improved even if the co-located block in the backward reference picture has only the backward motion vector. Accordingly, coding efficiency can be improved. In addition, by using a picture referred to by the backward motion vector as a forward reference picture, and a reference picture which is temporally closest available in display order as a backward reference picture, coding efficiency can be increased.

Next, the fifth example of the direct mode will be explained with reference to FIG. 8A. FIG. 8A is an illustration showing motion vectors in direct mode, and specifically showing the case where the block a of the picture B6 is coded in direct mode. In this case, on the assumption that the value of the motion vectors is "0", bi-predictive reference is performed for motion compensation, using the picture P5 as a forward reference picture and the picture B7 as a backward reference picture.

As mentioned above, by forcing the motion vector "0" in direct mode, when the direct mode is selected, there is no need to transmit the motion vector information nor to scale the motion vector, and thus the processing volume can be reduced.

Next, the sixth example of the direct mode will be explained with reference to FIG. 8B. FIG. 8B is an illustration showing motion vectors in direct mode, and specifically showing the case where the block a in the picture B6 is coded in direct mode. In this case, the motion vector g which has been used for coding the block f in the picture P9 is utilized. The picture P9 is located later than the picture B6, and the block f is co-located with the block a in the picture B6. The motion vector g is stored in the motion vector storage unit 116. The block a is bi-predicted from the forward reference picture P5 and the backward reference picture B7 using motion vectors generated utilizing the motion vector g. For example, if a method of generating motion vectors parallel to the motion vector g is used, as is the case of the above-mentioned first example, motion vectors used for coding the block a are the motion vector h and the motion vector i for the picture P5 and the picture B7 respectively for coding the block a.

In this case, where the forward motion vector h is MVF, the backward motion vector i is MVB, the motion vector g is MV, the temporal distance between the picture P9 which is located later in display order than the current picture B6 and the picture P5 which the block f in the picture P9 refers to is TRD, the temporal distance between the current picture B6 and the forward reference picture P5 is TRF, and the temporal distance between the current picture B6 and the backward reference picture B7 is TRB respectively, the motion vector h MVF and the motion vector i MVB are respectively calculated by Equation 1 and Equation 5.

$$MVB = -TRB \times MV/TRD \qquad \text{Equation 5}$$

As described above, in direct mode, by scaling the motion vector of the P-picture which is located later in display order, there is no need to store the motion vector of a B-picture if the B-picture is the backward reference picture, and there is also no need to transmit the motion vector information. In addition, by using reference pictures which are temporally closest in display order as a forward reference picture and a backward reference picture, coding efficiency can be increased.

Next, the seventh example of the direct mode will be explained with reference to FIG. 8C. FIG. 8C is an illustration showing motion vectors in direct mode, and specifically showing the case where the block a in the picture B6 is coded in direct mode. This example shows the case where the above-mentioned assignment of relative indices to the picture numbers is changed (remapped) and the picture P9 is a backward reference picture. In this case, the motion vector g which has been used for coding the block f in the picture P9 is utilized. The picture P9 is the backward reference picture for the picture B7, and the block f is co-located with the block a in the picture B6. The motion vector g is stored in the motion vector storage unit 116. The block a is bi-predicted from the forward reference picture P5 and the backward reference picture P9 using motion vectors generated utilizing the motion vector g. For example, if a method of generating motion vectors parallel to the motion vector g, as is the case of the above-mentioned first example, motion vectors used for coding the block a are the motion vector h and the motion vector i for the picture P5 and the picture P9 respectively.

In this case, where the forward motion vector h is MVF, the backward motion vector i is MVB, the motion vector g is MV, the temporal distance between the backward reference picture P9 for the current picture B6 and the picture P5 which the block f in the picture P9 refers to is TRD, and the temporal distance between the current picture B6 and the forward reference picture P5 is TRF respectively, the motion vector h MVF and the motion vector i MVB are respectively calculated by Equation 1 and Equation 2.

As described above, in direct mode, the motion vector of the previously coded picture can be scaled even if the relative indices to the picture numbers are remapped, and when the direct mode is selected, there is no need to transmit the motion vector information.

When the block a in the picture B6 is coded in direct mode, the block in the backward reference picture for the picture B6 which is co-located with the block a is coded by the forward reference only, bi-predictive reference, or direct mode. And when a forward motion vector has been used for this coding, this forward motion vector is scaled, and the block a is coded in direct mode, as is the case of the above-mentioned first, second or seventh example. On the other hand, when the block co-located with the block a has been coded by backward reference only using a backward motion vector, this backward motion vector is scaled, and the block a is coded in direct mode, as is the case of the above-mentioned third or fourth example.

Above-mentioned direct mode is applicable not only to the case where a time interval between pictures is fixed but also to the case where it is variable.

The mode selection unit 109 outputs the determined coding mode to the bit stream generation unit 104. Also, the mode selection unit 109 generates predictive image data based on the determined coding mode and outputs it to the difference calculation unit 102. However, if selecting intra picture coding, the mode selection unit 109 does not output predictive image data. The mode selection unit 109 controls the switches 111 and 112 so as to be connected to "a" side and "c" side respectively if selecting intra picture coding, and controls the switches 111 and 112 so as to be connected to "b" side and "d" side if selecting inter picture prediction coding or a direct mode. If the determined coding mode is inter picture prediction coding, the mode selection unit 109 outputs the motion vectors used for the inter picture prediction coding to the bit stream generation unit 104. Since the picture B6 is not used as a reference picture for coding other pictures, there is no need to store the motion vectors used for the inter picture prediction coding in the motion vector storage unit 116. The case will be explained below where the mode selection unit 109 selects the inter picture prediction coding or the direct mode.

The difference calculation unit 102 receives the image data of the macroblock in the picture B6 read out from the reordering memory 101 and the predictive image data outputted from the mode selection unit 109. The difference calculation unit 102 calculates the difference between the image data of the macroblock in the picture B6 and the predictive image data and generates the residual error image data for outputting to the residual error coding unit 103. The residual error coding unit 103 performs coding processing such as frequency transform and quantization on the inputted residual error image data, and thus generates the coded data for outputting to the bit stream generation unit 104.

The bit stream generation unit 104 performs variable length coding or the like on the inputted coded data, further adds information such as motion vectors and a coding mode and so on to the data, and generates the bit stream for outputting.

That is the completion of coding one macroblock in the picture B6. According to the same processing, the remaining macroblocks in the picture B6 are coded. And after all the macroblocks in the picture B6 are coded, the picture B8 is coded.

(Coding of Picture B8)

Since a picture B8 is a B-picture, inter picture prediction coding is performed for the picture B8 with reference to two previously processed pictures located earlier or later than B6 in display order. The B-picture B8 refers to the picture B7 as a forward reference picture and the picture P9 as a backward reference picture, as described above. Since the picture B8 is not used as a reference picture for coding other pictures, the coding control unit 110 controls the switch 113 to be ON and the switches 114 and 115 to be OFF, which causes the macroblocks in the picture B8 read out from the reordering memory 101 to be inputted to the motion vector estimation unit 108, the mode selection unit 109 and the difference calculation unit 102.

Using the decoded picture data of the picture B7 and the decoded picture data of the picture P9 which are stored in the reference picture memory 107 as a forward reference picture and a backward reference picture respectively, the motion vector estimation unit 108 estimates the forward motion vector and the backward motion vector for the macroblock in the picture B8. And the motion vector estimation unit 108 outputs the estimated motion vectors to the mode selection unit 109.

The mode selection unit 109 determines the coding mode for the macroblock in the picture B8 using the motion vectors estimated by the motion vector estimation unit 108.

Here, the case where the macroblock in the picture B8 is coded using the direct mode will be explained with reference to FIG. 8D. FIG. 8D is an illustration showing motion vectors in direct mode, and specifically showing the case where a block a in the picture B8 is coded in direct mode. In this case, a motion vector c which has been used for coding a block b in the backward picture P9 is utilized. The reference picture P9 is located later than the picture B8, and the block b in the picture P9 is co-located with the block a. Here, it is assumed that the block b has been coded by forward reference and the forward motion vector for the block b is the motion vector c. The motion vector c is stored in the motion vector storage unit 116. The block a is bi-predicted from the forward reference picture B7 and the backward reference picture P9 using motion vectors generated utilizing the motion vector c. For example, if a method of generating motion vectors parallel to the motion vector c is used, as is the case of the above-mentioned picture B7, the motion vector d and the motion vector e are used for the picture B7 and the picture P9 respectively for coding the block a.

In this case where the forward motion vector d is MVF, the backward motion vector e is MVB, the motion vector c is MV, the temporal distance between the backward reference picture P9 for the current picture B8 and the picture P5 which the block b in the backward reference picture P9 refers to is TRD, the temporal distance between the current picture B8 and the forward reference picture B7 is TRF, and the temporal distance between the current picture B8 and the backward reference picture P9 is TRB respectively, the motion vector d MVF and the motion vector e MVB are respectively calculated by Equation 1 and Equation 5.

As described above, in direct mode, by scaling the forward motion vector of the backward reference picture, when the direct mode is selected, there is no need to transmit the motion vector information and the motion prediction efficiency can be improved. Accordingly, coding efficiency can be improved. In addition, by using reference pictures which are temporally closest available in display order as forward and backward reference pictures, coding efficiency can be increased.

Above-mentioned direct mode is applicable not only to the case where a time interval between pictures is fixed but also to the case where it is variable.

The mode selection unit 109 outputs the determined coding mode to the bit stream generation unit 104. Also, the mode selection unit 109 generates predictive image data based on the determined coding mode and outputs it to the difference calculation unit 102. However, if selecting intra picture coding, the mode selection unit 109 does not output predictive image data. The mode selection unit 109 controls the switches 111 and 112 so as to be connected to "a" side and "c" side respectively if selecting intra picture coding, and controls the switches 111 and 112 so as to be connected to "b" side and "d" side if selecting inter picture prediction coding or direct mode. If the determined coding mode is inter picture prediction coding, the mode selection unit 109 outputs the motion vectors used for the inter picture prediction coding to the bit stream generation unit 104. Since the picture B8 is not be used as a reference picture for coding other pictures, there is no need to store the motion vectors used for the inter picture prediction coding in the motion vector storage unit 116. The case will be explained below where the mode selection unit 109 selects the inter picture prediction coding or direct mode.

The difference calculation unit 102 receives the image data of the macroblock in the picture B8 read out from the reordering memory 101 and the predictive image data outputted from the mode selection unit 109. The difference calculation unit 102 calculates the difference between the image data of the macroblock in the picture B8 and the predictive image data and generates the residual error image data for outputting to the residual error coding unit 103. The residual error coding unit 103 performs coding processing such as frequency transform and quantization on the inputted residual error image data and thus generates the coded data for outputting to the bit stream generation unit 104.

The bit stream generation unit 104 performs variable length coding or the like on the inputted coded data, further adds information such as motion vectors and a coding mode and so on to the data, and generates the bit stream for outputting.

That is the completion of coding one macroblock in the picture B8. According to the same processing, the remaining macroblocks in the picture B8 are coded.

According to the above-mentioned respective coding procedures for the pictures P9, B7, B6 and B8, other pictures are coded depending on their picture types and temporal locations in display order.

In the above-mentioned embodiment, the moving picture coding method according to the present invention has been explained taking the case where the picture prediction structure as shown in FIG. 6A is used as an example. FIG. 12 is an illustration showing this picture prediction structure hierarchically. In FIG. 12, arrows indicate prediction relations, in which the pictures pointed by the arrows refer to the pictures located at the origins of the arrows. In the picture prediction structure as shown in FIG. 6A, the coding order is determined by giving a top priority to the pictures which are farthest from the previously processed pictures in display order, as shown in FIG. 12. For example, the picture farthest from an I-picture or a P-picture is that located in the center of the consecutive B-pictures. Therefore, if the picture P5 and P9 have been coded, the picture B7 is to be coded next. And if the pictures P5, B7 and P9 have been coded, the pictures B6 and B8 are to be coded next.

In addition, the moving picture coding method according to the present invention can be used for other picture prediction structures than those as shown in FIG. 6 and FIG. 12, so as to produce the effects of the present invention. FIGS. 9~11 show the examples of other picture prediction structures.

FIG. 9 shows the case where 3 B-pictures are located between I-pictures and P-pictures and the B-picture closest from the previously processed picture is selected for coding first. FIG. 9A is a diagram showing prediction relations between respective pictures arranged in display order, and FIG. 9B is a diagram showing the sequence of pictures reordered in coding order (a bit stream). FIG. 13 is a hierarchical diagram of the picture prediction structure corresponding to FIG. 9A. In the picture prediction structure as shown in FIG. 9A, the pictures closest in display order from the previously processed pictures are coded first, as shown in FIG. 13. For example, if the pictures P5 and P9 have been coded, the pictures B6 and B8 are to be coded next. If the pictures P5, B6, B8 and P9 have been coded, the picture B7 is to be coded next.

FIG. 10 shows the case where 5 B-pictures are located between I-pictures and P-pictures and the B-picture which is farthest from the previously processed picture is selected for coding first. FIG. 10A is a diagram showing prediction relations between respective pictures arranged in display order, and FIG. 10B is a diagram showing the sequence of pictures reordered in coding order (a bit stream). FIG. 14 is a hierarchical diagram of the picture prediction structure corresponding to FIG. 10A. In the picture prediction structure as shown in FIG. 10A, the coding order is determined by giving a top priority to the pictures farthest in display order from the previously processed pictures, as shown in FIG. 14. For example, the picture farthest from an I-picture or a P-picture is the B-picture in the center of the consecutive B-pictures. Therefore, if the pictures P7 and P13 have been coded, the picture B10 is to be coded next. If the pictures P7, B10 and P13 have been coded, the pictures B8, B9, B11 and B12 are to be coded next.

FIG. 11 shows the case where 5 B-pictures are located between I-pictures and P-pictures and the B-picture which is closest from the previously processed picture is selected for coding first. FIG. 11A is a diagram showing prediction relations between respective pictures arranged in display order, and FIG. 11B is a diagram showing the sequence of pictures reordered in coding order (a bit stream). FIG. 15 is a hierarchical diagram of the picture prediction structure corresponding to FIG. 11A. In the picture prediction structure as shown in FIG. 11A, the pictures closest in display order from the previously processed pictures are coded first, as shown in FIG. 15. For example, if the pictures P5 and P9 have been coded, the pictures B8 and B12 are to be coded next. If the pictures P5, B8, B12 and P9 have been coded, the pictures B9 and B11 are to be coded next. Furthermore, if the pictures P5, B8, B9, B11, B12 and P9 have been coded, the picture B10 is to be coded next.

As described above, according to the moving picture coding method of the present invention, when inter picture prediction coding is performed on a plurality of B-pictures located between I-pictures and P-pictures using bi-predictive reference, they are coded in another order than display order. For that purpose, the pictures located as close to the current picture as possible in display order are used as forward and backward pictures. As a reference picture, a B-picture is also used if it is available. When a plurality of B-pictures located between I-pictures and P-pictures are coded in different order from display order, the picture farthest from the previously processed picture is to be coded first. Or, when a plurality of B-pictures located between I-pictures and P-pictures are coded in different order from display order, the picture closest from the previously processed picture is to be coded first.

According to the moving picture coding method of the present invention, above-mentioned operation enables to use a picture closer to a current B-picture in display order as a reference picture for coding it. Prediction efficiency is thus increased for motion compensation and coding efficiency is increased.

In addition, according to the moving picture coding method of the present invention, for coding a block in a B-picture in direct mode with reference to a B-picture previously coded as a backward reference picture, if the co-located block in the backward reference B-picture has been coded by forward reference or bi-predictive reference, a motion vector obtained by scaling the forward motion vector of the backward reference B-picture is used as a motion vector in direct mode.

As mentioned above, in direct mode, by scaling a forward motion vector of a backward reference B-picture, there is no need to transmit motion vector information, and prediction efficiency can be increased. In addition, by using a reference picture temporally closest in display order as a forward reference picture, coding efficiency can be increased.

Or, if a co-located block in a backward reference B-picture is coded in direct mode, a motion vector obtained by scaling the forward motion vector substantially used in direct mode is used as a motion vector in direct mode.

As mentioned above, in direct mode, by scaling a forward motion vector of a backward reference B-picture which has been substantially used for the direct mode coding, there is no need to transmit motion vector information, and prediction efficiency can be increased even if the co-located block in the backward reference picture is coded in direct mode. In addition, coding efficiency can be improved by using a temporally closest reference picture as a forward reference picture.

Or, if a co-located block in a backward reference B-picture is coded by backward reference, motion vectors obtained by scaling the backward motion vector of the block is used as motion vectors in direct mode.

As mentioned above, in direct mode, by scaling a backward motion vector which has been used for coding a co-located block in the backward reference B-picture, there is no need to transmit motion vector information, and prediction efficiency can be increased even if the co-located block in the backward reference picture has only a backward motion vector. In addition, by using a temporally closest reference picture as a forward reference picture, coding efficiency can be improved.

Or, if a co-located block in a backward reference B-picture is coded by backward reference, motion vectors obtained by scaling the backward motion vector used for that coding, with reference to the picture referred to by this backward motion vector and the backward reference picture, are used as motion vectors in direct mode.

As mentioned above, in direct mode, by scaling a backward motion vector which has been used for coding a co-located block in the backward reference B-picture, there is no need to transmit motion vector information, and prediction efficiency can be increased even if the co-located block in the backward reference picture has only a backward motion vector. Accordingly, coding efficiency can be improved. In addition, by using a picture referred to by the backward motion vector as a forward reference picture and a reference picture temporally closest available in display order as a backward reference picture, coding efficiency can be increased.

Or, in direct mode, a motion vector which is forced to be set to "0" is used.

By forcing a motion vector to be set to "0" in direct mode, when the direct mode is selected, there is no need to transmit the motion vector information nor to scale the motion vector, and therefore the processing volume can be reduced.

In addition, according to the moving picture coding method of the present invention, for coding a block in a B-picture in direct mode with reference to a B-picture which has been previously coded as a backward reference picture, a motion vector obtained by scaling the forward motion vector which has been used for coding the co-located block in the later P-picture is used as a motion vector in direct mode.

As mentioned above, in direct mode, by scaling a motion vector of a later P-picture, if the backward reference picture is a B-picture, there is no need to store the motion vectors of the B-picture and there is no need to transmit the motion vector information, and thus prediction efficiency can be increased. In addition, by using a temporally closest reference picture as a forward reference picture, coding efficiency can be improved.

When assignment of relative indices to picture numbers is changed and a co-located block in a backward reference picture has been coded by forward reference, motion vectors obtained by scaling that forward motion vector are used as motion vectors in direct mode.

As mentioned above, in direct mode, a motion vector of a previously coded picture can be scaled even if assignment of relative indices to picture numbers is changed, and there is no need to transmit motion vector information.

In the present embodiment, the case has been explained where motion compensation is made in every 16 (horizontal)×16 (vertical) pixels and residual error image data is coded in every 8 (horizontal)×8 (vertical) pixels or 4 (horizontal)×4 (vertical) pixels, but other size (number of pixels included) may be applied.

Also, in the present embodiment, the case has been explained where consecutive 3 or 5 B-pictures are located, but other number of pictures may be located.

Further, in the present embodiment, the case has been explained where one of intra picture coding, inter picture prediction coding using motion vectors and inter picture prediction coding without using motion vectors is selected as a coding mode for P-pictures, and one of intra picture coding, inter picture prediction coding using a forward motion vector, inter picture prediction coding using a backward motion vector, inter picture prediction coding using a bi-predictive motion vectors and direct mode is selected for B-pictures, but other coding mode may be used.

Also, in the present embodiment, seven examples of direct mode have been explained, but a method which is uniquely determined in every macroblock or block may be used, or any of a plurality of methods in every macroblock or block may be selected. If a plurality of methods are used, information indicating which type of direct mode has been used is described in a bit stream.

In addition, in the present embodiment, the case has been explained where a P-picture is coded with reference to one previously coded I or P-picture which is located temporally earlier or later in display order than the current P-picture, and a B-picture is coded with reference to two previously processed neighboring pictures which are located earlier or later in display order than the current B-picture, respectively. However, in the case of a P-picture, the P-picture may be coded with reference to at most one picture for each block from among a plurality of previously coded I or P pictures as candidate reference pictures, and in the case of a B-picture, the B-picture may be coded with reference to at most two pictures for each block from among a plurality of previously coded neighboring pictures which are located temporally earlier or later in display order as candidate reference pictures.

In addition, when storing motion vectors in the motion vector storage unit 116, the mode selection unit 109 may store both forward and backward motion vectors or only a forward motion vector, if a current block is coded by bi-predictive reference or in direct mode. If it stores only the forward motion vector, the volume stored in the motion vector storage unit 116 can be reduced.

Second Embodiment

FIG. 16 is a block diagram showing a structure of a moving picture decoding apparatus using a moving picture decoding method according to an embodiment of the present invention.

As shown in FIG. 16, the moving picture decoding apparatus includes a bit stream analysis unit 1401, a residual error decoding unit 1402, a mode decoding unit 1403, a frame memory control unit 1404, a motion compensation decoding unit 1405, a motion vector storage unit 1406, a frame memory 1407, an addition unit 1408 and switches 1409 and 1410.

The bit stream analysis unit 1401 extracts various types of data such as coding mode information and motion vector information from the inputted bit stream. The residual error decoding unit 1402 decodes the residual error coded data inputted from the bit stream analysis unit 1401 and generates residual error image data. The mode decoding unit 1403 controls the switches 1409 and 1410 with reference to the coding mode information extracted from the bit stream.

The frame memory control unit 1404 outputs the decoded picture data stored in the frame memory 1407 as output pictures based on the information indicating the display order of the pictures inputted from the bit stream analysis unit 1401.

The motion compensation decoding unit 1405 decodes the information of the reference picture numbers and the motion vectors, and obtains motion compensation image data from the frame memory 1407 based on the decoded reference picture numbers and motion vectors. The motion vector storage unit 1406 stores motion vectors.

The addition unit 1408 adds the residual error coded data inputted from the residual error decoding unit 1402 and the motion compensation image data inputted from the motion compensation decoding unit 1405 for generating the decoded image data. The frame memory 1407 stores the generated decoded image data.

Next, the operation of the moving picture decoding apparatus as structured as above will be explained. Here, it is assumed that the bit stream generated by the moving picture coding apparatus is inputted to the moving picture decoding apparatus. Specifically, it is assumed that a P-picture refers to one previously processed neighboring I or P-picture which is located earlier or later than the current P-picture in display order, and a B-picture refers to two previously coded neighboring pictures which are located earlier or later than the current B-picture in display order.

In this case, the pictures in the bit stream are arranged in the order as shown in FIG. 6B. Decoding processing of pictures P9, B7, B6 and B8 will be explained below in this order.

(Decoding of Picture P9)

The bit stream of the picture P9 is inputted to the bit stream analysis unit 1401. The bit stream analysis unit 1401 extracts various types of data from the inputted bit stream. Here, various types of data mean mode selection information, motion vector information and others. The extracted mode selection information is outputted to the mode decoding unit 1403. The extracted motion vector information is outputted to the motion compensation decoding unit 1405. And the residual error coded data is outputted to the residual error decoding unit 1402.

The mode decoding unit 1403 controls the switches 1409 and 1410 with reference to the coding mode selection information extracted from the bit stream. If intra picture coding is selected as a coding mode, the mode decoding unit 1403 controls the switches 1409 and 1410 so as to be connected to "a" side and "c" side respectively. If inter picture prediction coding is selected as a coding mode, the mode decoding unit 1403 controls the switches 1409 and 1410 so as to be connected to "b" side and "d" side respectively.

The mode decoding unit 1403 also outputs the coding mode selection information to the motion compensation decoding unit 1405. The case where the inter picture prediction coding is selected as a coding mode will be explained below. The residual error decoding unit 1402 decodes the inputted residual error coded data to generate residual error image data. The residual error decoding unit 1402 outputs the generated residual error image data to the switch 1409. Since the switch 1409 is connected to "b" side, the residual error image data is outputted to the addition unit 1408.

The motion compensation decoding unit 1405 obtains motion compensation image data from the frame memory 1407 based on the inputted motion vector information and the like. The picture P9 has been coded with reference to the picture P5, and the picture P5 has been already decoded and stored in the frame memory 1407. So, the motion compensation decoding unit 1405 obtains the motion compensation image data from the picture data of the picture P5 stored in the frame memory 1407, based on the motion vector information. The motion compensation image data generated in this manner is outputted to the addition unit 1408.

When decoding P-pictures, the motion compensation decoding unit 1405 stores the motion vector information in the motion vector storage unit 1406.

The addition unit 1408 adds the inputted residual error image data and motion compensation image data to generate decoded image data. The generated decoded image data is outputted to the frame memory 1407 via the switch 1410.

That is the completion of decoding one macroblock in the picture P9. According to the same processing, the remaining macroblocks in the picture P9 are decoded in sequence. And after all the macroblocks in the picture P9 are decoded, the picture B7 is decoded.

(Decoding of Picture B7)

Since the operations of the bit stream analysis unit 1401, the mode decoding unit 1403 and the residual error decoding unit 1402 until generation of residual error image data are same as those for decoding the picture P9, the explanation thereof will be omitted.

The motion compensation decoding unit 1405 generates motion compensation image data based on the inputted motion vector information and the like. The picture B7 is coded with reference to the picture P5 as a forward reference picture and the picture P9 as a backward reference picture, and these pictures P5 and P9 have already been decoded and stored in the frame memory 1407.

If inter picture bi-prediction coding is selected as a coding mode, the motion compensation decoding unit 1405 obtains the forward reference picture data from the frame memory 1407 based on the forward motion vector information. It also obtains the backward reference picture data from the frame memory 1407 based on the backward motion vector information. Then, the motion compensation decoding unit 1405 averages the forward and backward reference picture data to generate motion compensation image data.

When direct mode is selected as a coding mode, the motion compensation decoding unit 1405 obtains the motion vector of the picture P9 stored in the motion vector storage unit 1406.

Using this motion vector, the motion compensation decoding unit 1405 obtains the forward and backward reference picture data from the frame memory 1407. Then, the motion compensation decoding unit 1405 averages the forward and backward reference picture data to generate motion compensation image data.

The case where the direct mode is selected as a coding mode will be explained with reference to FIG. 7A again. Here, it is assumed that the block a in the picture B7 is to be decoded and the block b in the picture P9 is co-located with the block a. The motion vector of the block b is the motion vector c, which refers to the picture P5. In this case, the motion vector d which is obtained utilizing the motion vector c and refers to the picture P5 is used as a forward motion vector, and the motion vector e which is obtained utilizing the motion vector c and refers to the picture P9 is used as a backward motion vector. For example, as a method of utilizing the motion vector c, there is a method of generating motion vectors parallel to the motion vector c. The motion compensation image data is obtained by averaging the forward and backward reference data obtained based on these motion vectors.

In this case where the forward motion vector d is MVF, the backward motion vector e is MVB, the motion vector c is MV, the temporal distance between the backward reference picture P9 for the current picture B7 and the picture P5 which the block b in the backward reference picture P9 refers to is TRD, and the temporal distance between the current picture B7 and the forward reference picture P5 is TRF respectively, the motion vector d MVF and the motion vector e MVB are respectively calculated by Equation 1 and Equation 2, where MVF and MVB represent horizontal and vertical components of the motion vectors respectively. Note that the temporal distance between the pictures can be determined based on the information indicating the display order (position) given to respective pictures or the difference specified by the information.

The motion compensation image data generated in this manner is outputted to the addition unit 1408. The motion compensation decoding unit 1405 stores the motion vector information in the motion vector storage unit 1406.

The addition unit 1408 adds the inputted residual error image data and the motion compensation image data to generate decoded image data. The generated decoded image data is outputted to the frame memory 1407 via the switch 1410.

That is the completion of decoding one macroblock in the picture B7. According to the same processing, the remaining macroblocks in the picture B7 are decoded in sequence. And after all the macroblocks of the picture B7 are decoded, the picture B6 is decoded.

(Decoding of Picture B6)

Since the operations of the bit stream analysis unit 1401, the mode decoding unit 1403 and the residual error decoding unit 1402 until generation of residual error image data are same as those for decoding the picture P9, the explanation thereof will be omitted.

The motion compensation decoding unit 1405 generates motion compensation image data based on the inputted motion vector information and the like. The picture B6 has been coded with reference to the picture P5 as a forward reference picture and the picture B7 as a backward reference picture, and these pictures P5 and B7 have been already decoded and stored in the frame memory 1407.

If inter picture bi-prediction coding is selected as a coding mode, the motion compensation decoding unit 1405 obtains the forward reference picture data from the frame memory 1407 based on the forward motion vector information. It also obtains the backward reference picture data from the frame memory 1407 based on the backward motion vector information. Then, the motion compensation decoding unit 1405 averages the forward and backward reference picture data to generate motion compensation image data.

When the direct mode is selected as a coding mode, the motion compensation decoding unit 1405 obtains the motion vector of the picture B7 stored in the motion vector storage unit 1406. Using this motion vector, the motion compensation decoding unit 1405 obtains the forward and backward reference picture data from the frame memory 1407. Then, the motion compensation decoding unit 1405 averages the forward and backward reference picture data to generate motion compensation image data.

The first example of the case where the direct mode is selected as a coding mode will be explained with reference to FIG. 7B again. Here, it is assumed that the block a in the picture B6 is to be decoded and the block b in the picture B7 is co-located with the block a. The block b has been coded by forward reference inter picture prediction or bi-predictive reference inter picture prediction, and the forward motion vector of the block b is the motion vector c, which refers to the picture P5. In this case, the motion vector d which is obtained utilizing the motion vector c and refers to the picture P5 is used as a forward motion vector, and the motion vector e which is obtained utilizing the motion vector c and refers to the picture B7 is used as a backward motion vector. For example, as a method of utilizing the motion vector c, there is a method of generating motion vectors parallel to the motion vector c. The motion compensation image data is obtained by averaging the forward and backward reference picture data obtained based on these motion vectors d and e.

In this case where the forward motion vector d is MVF, the backward motion vector e is MVB, the motion vector c is MV, the temporal distance between the backward reference picture B7 for the current picture B6 and the picture P5 which the block b in the backward reference picture B7 refers to is TRD, and the temporal distance between the current picture B6 and the forward reference picture P5 is TRF respectively, the motion vector d MVF and the motion vector e MVB are respectively calculated by Equation 1 and Equation 2. Note that the temporal distance between pictures may be determined based on the information indicating the display order (position) of the pictures or the difference specified by the information. Or, as the values of TRD and TRF, predetermined values for respective pictures may be used. These predetermined values may be described in the bit stream as header information.

The second example of the case where the direct mode is selected as a coding mode will be explained with reference to FIG. 7B again.

In this example, the motion vector which has been used for decoding the block b in the picture B7 is utilized. The picture B7 is the backward reference picture for the current picture B6, and the block b is co-located with the block a in the picture B6. Here, it is assumed that the block b has been coded in direct mode and the motion vector c has been substantially used as a forward motion vector for that coding. The motion vector c stored in the motion vector storage unit 1406 may be used, or it is calculated by reading out from the motion vector storage unit 1406 the motion vector of the picture P9 which has been used for coding the block b in direct mode, and then scaling that motion vector. Note that when storing motion vectors in the motion vector storage unit 1406, the motion compensation decoding unit 1405 needs to store only the forward motion vector out of the two motion vectors obtained by scaling for decoding the block b in the picture B7 in direct mode.

In this case, for the block a, the motion vector d which is generated utilizing the motion vector c and refers to the picture P5 is used as a forward motion vector, and the motion vector e which is generated utilizing the motion vector c and refers to the picture B7 is used as a backward motion vector. For example, as a method of utilizing the motion vector c, there is a method of generating motion vectors parallel to the motion vector c. The motion compensation image data is obtained by averaging the forward and backward reference picture data obtained based on these motion vectors d and e.

In this case, the motion vector d MVF and the motion vector e MVB are respectively calculated by Equation 1 and Equation 2, as is the case of the first example of the direct mode.

Next, the third example of the case where the direct mode is selected as a coding mode will be explained with reference to FIG. 7C again.

In this example, it is assumed that the block a in the picture B6 is to be decoded, and the block b in the picture B7 is co-located with the block a. The block b has been coded by backward reference prediction, and the backward motion vector of the block b is a motion vector f, which refers to the picture P9. In this case, for the block a, the motion vector g which is obtained utilizing the motion vector f and refers to the picture P5 is used as a forward motion vector, and the motion vector h which is obtained utilizing the motion vector f and refers to the picture B7 is used as a backward motion vector. For example, as a method of utilizing the motion vector f, there is a method of generating motion vectors parallel to the motion vector f. The motion compensation image data is obtained by averaging the forward and backward reference picture data obtained based on these motion vectors g and h.

In this case where the forward motion vector g is MVF, the backward motion vector h is MVB, the motion vector f is MV, the temporal distance between the backward reference picture B7 for the current picture B6 and the picture P9 which the block b in the backward reference picture B7 refers to is TRD, the temporal distance between the current picture B6 and the forward reference picture P5 is TRF, and the temporal distance between the current picture B6 and the backward reference picture B7 is TRB respectively, the motion vector g MVF and the motion vector h MVB are respectively calculated by Equation 3 and Equation 4.

Next, the fourth example of the case where the direct mode is selected as a coding mode will be explained with reference to FIG. 7D again.

In this example, it is assumed that the block a in the picture B6 is to be decoded, and the block b in the picture B7 is co-located with the block a. The block b has been coded by backward reference prediction as is the case of the third example, and the backward motion vector of the block b is a motion vector f, which refers to the picture P9. In this case, the motion vector g which is obtained utilizing the motion vector f and refers to the picture P9 is used as a forward motion vector, and the motion vector h which is obtained utilizing the motion vector f and refers to the picture B7 is used as a backward motion vector. For example, as a method of utilizing the motion vector f, there is a method of generating motion vectors parallel to the motion vector f. The motion compensation image data is obtained by averaging the forward and backward reference picture data obtained based on these motion vectors g and h.

In this case where the forward motion vector g is MVF, the backward motion vector h is MVB, the motion vector f is MV, the temporal distance between the backward reference picture B7 for the current picture B6 and the picture P9 which the block b in the backward reference picture B7 refers to is TRD, and the temporal distance between the current picture B6 and the reference picture P9 which the block b in the backward reference picture B7 refers to is TRF respectively, the motion vector g MVF and the motion vector h MVB are respectively calculated by Equation 1 and Equation 2.

Furthermore, the fifth example of the case where the direct mode is selected as a coding mode will be explained with reference to FIG. 8A again. Here, it is assumed that a block a in the picture B6 is to be decoded in direct mode. In this example, the motion vector is set to zero "0", and motion compensation is performed by bi-predictive reference using the picture P5 as a forward reference picture and the picture B7 as a backward reference picture.

Next, the sixth example of the case where the direct mode is selected as a coding mode will be explained with reference to FIG. 8B again. Here, it is assumed that a block a in the picture B6 is to be decoded in direct mode. In this example, the motion vector g which has been used for decoding the block f in the P-picture P9 is utilized. The picture P9 is located later than the current picture B6, and the block f is co-located with the block a. The motion vector g is stored in the motion vector storage unit 1406. The block a is bi-predicted from the forward reference picture P5 and the backward reference picture B7 using the motion vectors which are obtained utilizing the motion vector g. For example, if a method of generating motion vectors parallel to the motion vector g is used, as is the case of the above-mentioned first example, the motion vector h and the motion vector i are used for the picture P5 and the picture B7 respectively for obtaining the motion compensation image data of the block a.

In this case where the forward motion vector h is MVF, the backward motion vector i is MVB, the motion vector g is MV, the temporal distance between the picture P9 located later than the current picture B6 and the picture P5 which the block f in the picture P9 refers to is TRD, the temporal distance between the current picture B6 and the forward reference picture P5 is TRF, and the temporal distance between the current picture B6 and the backward reference picture B7 is TRB respectively, the motion vector h MVF and the motion vector i MVB are respectively calculated by Equation 1 and Equation 5.

Next, the seventh example of the case where the direct mode is selected as a coding mode will be explained with reference to FIG. 8C again. Here, it is assumed that a block a in the picture B6 is decoded in direct mode. In this example, the assignment of relative indices to the above-mentioned picture numbers is changed (remapped) and the picture P9 is the backward reference picture. In this case, the motion vector g which has been used for coding the block f in the picture P9 is utilized. The picture P9 is the backward reference picture for the picture B6, and the block f is co-located with the block a in the picture B6. The motion vector g is stored in the motion vector storage unit 1406. The block a is bi-predicted from the forward reference picture P5 and the backward reference picture P9 using motion vectors generated utilizing the motion vector g. For example, if a method of generating motion vectors parallel to the motion vector g is used, as is the case of the above-mentioned first example, the motion vector h and the motion vector i are used for the picture P5 and the picture P9 respectively for obtaining the motion compensation image data of the block a.

In this case, where the forward motion vector h is MVF, the backward motion vector i is MVB, the motion vector g is MV, the temporal distance between the backward reference picture P9 for the current picture B6 and the picture P5 which the block f in the picture P9 refers to is TRD, and the temporal distance between the current picture B6 and the forward reference picture P5 is TRF respectively, the motion vector h MVF and the motion vector i MVB are respectively calculated by Equation 1 and Equation 2.

The motion compensation image data generated as above is outputted to the addition unit 1408. The addition unit 1408 adds the inputted residual error image data and the motion compensation image data to generate decoded image data. The generated decoded image data is outputted to the frame memory 1407 via the switch 1410.

That is the completion of decoding one macroblock in the picture B6. According to the same processing, the remaining macroblocks in the picture B6 are decoded in sequence. And after all the macroblocks in the picture B6 are decoded, the picture B8 is decoded.

(Decoding of Picture B8)

Since the operations of the bit stream analysis unit 1401, the mode decoding unit 1403 and the residual error decoding unit 1402 until generation of residual error image data are same as those for decoding the picture P9, the explanation thereof will be omitted.

The motion compensation decoding unit 1405 generates motion compensation image data based on the inputted motion vector information and the like. The picture B8 has been coded with reference to the picture B7 as a forward reference picture and the picture P9 as a backward reference picture, and these pictures B7 and P9 have been already decoded and stored in the frame memory 1407.

If inter picture bi-prediction coding is selected as a coding mode, the motion compensation decoding unit 1405 obtains the forward reference image data from the frame memory 1407 based on the forward motion vector information. It also obtains the backward reference image data from the frame memory 1407 based on the backward motion vector information. Then, the motion compensation decoding unit 1405 averages the forward and backward reference image data to generate motion compensation image data.

When direct mode is selected as a coding mode, the motion compensation decoding unit 1405 obtains the motion vector of the picture P9 stored in the motion vector storage unit 1406. Using this motion vector, the motion compensation decoding unit 1405 obtains the forward and backward reference image data from the frame memory 1407. Then, the motion compensation decoding unit 1405 averages the forward and backward reference picture data to generate motion compensation image data.

The case where the direct mode is selected as a coding mode will be explained with reference to FIG. 8D again. Here, it is assumed that a block a in the picture B8 is to be decoded and a block b in the backward reference picture P9 is co-located with the block a. The forward motion vector of the block b is the motion vector c, which refers to the picture P5. In this case, the motion vector d which is generated utilizing the motion vector c and refers to the picture B7 is used as a forward motion vector, and the motion vector e which is generated utilizing the motion vector c and refers to the picture P9 is used as a backward motion vector. For example, as a method of utilizing the motion vector c, there is a method of generating motion vectors parallel to the motion vector c. The motion compensation image data is obtained by averaging the forward and backward reference image data obtained based on these motion vectors d and e.

In this case where the forward motion vector d is MVF, the backward motion vector e is MVB, the motion vector c is MV, the temporal distance between the backward reference picture P9 for the current picture B8 and the picture P5 which the block b in the backward reference picture P9 refers to is TRD, the temporal distance between the current picture B8 and the forward reference picture B7 is TRF, and the temporal distance between the current picture B8 and the backward reference picture P9 is TRB respectively, the motion vector d MVF and the motion vector e MVB are respectively calculated by Equation 1 and Equation 5.

The motion compensation image data generated in this manner is outputted to the addition unit 1408. The addition unit 1408 adds the inputted residual error image data and the motion compensation image data to generate decoded image data. The generated decoded image data is outputted to the frame memory 1407 via the switch 1410.

That is the completion of decoding one macroblock in the picture B8. According to the same processing, the remaining macroblocks in the picture B8 are decoded in sequence. The other pictures are decoded depending on their picture types according to the above-mentioned decoding procedures.

Next, the frame memory control unit 1404 reorders the picture data of the pictures stored in the frame memory 1407 in time order as shown in FIG. 6A for outputting as output pictures.

As described above, according to the moving picture decoding method of the present invention, a B-picture which has been coded by inter picture bi-prediction is decoded using previously decoded pictures which are located close in display order as forward and backward reference pictures.

When the direct mode is selected as a coding mode, reference image data is obtained from previously decoded image data to obtain motion compensation image data, with reference to a motion vector of a previously decoded backward reference picture stored in the motion vector storage unit 1406.

According to this operation, when a B-picture has been coded by inter picture bi-prediction using pictures which are located close in display order as forward and backward reference pictures, the bit stream generated as a result of such coding can be properly decoded.

In the present embodiment, seven examples of the direct mode have been explained. However, one method, which is uniquely determined for every macroblock or block based on the decoding method of a co-located block in a backward reference picture, may be used, or a plurality of different methods may be used for every macroblock or block by switching them. When a plurality of methods are used, the macroblock or the block is decoded using information described in a bit stream, indicating which type of direct mode has been used. For that purpose, the operation of the motion compensation decoding unit 1405 depends upon the information. For example, when this information is added for every block of motion compensation, the mode decoding unit 1403 determines which type of direct mode is used for coding and delivers it to the motion compensation decoding unit 1405. The motion compensation decoding unit 1405 performs decoding processing using the decoding method as explained in the present embodiment depending upon the delivered type of direct mode.

Also, in the present embodiment, the picture structure where three B-pictures are located between I-pictures and P-pictures has been explained, but any other number, four or five, for instance, of B-pictures may be located.

In addition, in the present embodiment, the explanation has been made on the assumption that a P-picture is coded with reference to one previously coded I or P-picture which is located earlier or later than the current P-picture in display order, a B-picture is coded with reference to two previously coded neighboring pictures which are located earlier or later than the current B-picture in display order, and the bit stream generated as a result of this coding is decoded. However, in the case of a P-picture, the P-picture may be coded with reference to at most one picture for each block from among a plurality of previously coded I or P pictures which are located temporally earlier or later in display order as candidate reference pictures, and in the case of a B-picture, the B-picture may be coded with reference to at most two pictures for each block from among a plurality of previously coded neighboring pictures which are located temporally earlier or later in display order as candidate reference pictures.

Furthermore, when storing motion vectors in the motion vector storage unit 1406, the motion compensation decoding unit 1405 may store both forward and backward motion vectors, or store only the forward motion vector, if a current block is coded by bi-predictive reference or in direct mode. If only the forward motion vector is stored, the memory volume of the motion vector storage unit 1406 can be reduced.

Third Embodiment

If a program for realizing the structures of the moving picture coding method or the moving picture decoding method as shown in the above embodiments is recorded on a memory medium such as a flexible disk, it becomes possible to perform the processing as shown in these embodiments easily in an independent computer system.

FIG. 17 is an illustration showing the case where the processing is performed in a computer system using a flexible disk which stores the moving picture coding method or the moving picture decoding method of the above embodiments.

FIG. 17B shows a front view and a cross-sectional view of an appearance of a flexible disk, and the flexible disk itself, and FIG. 17A shows an example of a physical format of a flexible disk as a recording medium body. The flexible disk FD is contained in a case F, and a plurality of tracks Tr are formed concentrically on the surface of the disk in the radius direction from the periphery and each track is divided into 16 sectors Se in the angular direction. Therefore, as for the flexible disk storing the above-mentioned program, the moving picture coding method as the program is recorded in an area allocated for it on the flexible disk FD.

FIG. 17C shows the structure for recording and reproducing the program on and from the flexible disk FD. When the program is recorded on the flexible disk FD, the moving picture coding method or the moving picture decoding method as a program is written in the flexible disk from the computer system Cs via a flexible disk drive. When the moving picture coding method is constructed in the computer system by the program on the flexible disk, the program is read out from the flexible disk drive and transferred to the computer system.

The above explanation is made on the assumption that a recording medium is a flexible disk, but the same processing can also be performed using an optical disk. In addition, the recording medium is not limited to a flexible disk and an optical disk, but any other medium such as an IC card and a ROM cassette capable of recording a program can be used.

Following is the explanation of the applications of the moving picture coding method and the moving picture decoding method as shown in the above embodiments, and the system using them.

FIG. 18 is a block diagram showing the overall configuration of a content supply system ex100 for realizing content distribution service. The area for providing communication service is divided into cells of desired size, and base stations ex107~ex110 which are fixed wireless stations are placed in respective cells.

In this content supply system ex100, devices such as a computer ex111, a PDA (personal digital assistant) ex112, a camera ex113, a mobile phone ex114 and a camera-equipped mobile phone ex115 are connected to the Internet ex 101 via an Internet service provider ex102, a telephone network ex104 and base stations ex107~ex110.

However, the content supply system ex100 is not limited to the configuration as shown in FIG. 18, and a combination of any of them may be connected. Also, each device may be connected directly to the telephone network ex104, not through the base stations ex107~ex110.

The camera ex113 is a device such as a digital video camera capable of shooting moving pictures. The mobile phone may be a mobile phone of a PDC (Personal Digital Communications) system, a CDMA (Code Division Multiple Access) system, a W-CDMA (Wideband-Code Division Multiple Access) system or a GSM (Global System for Mobile Communications) system, a PHS (Personal Handyphone system) or the like.

A streaming server ex103 is connected to the camera ex113 via the base station ex109 and the telephone network ex104, which enables live distribution or the like using the camera ex113 based on the coded data transmitted from a user. Either the camera ex113 or the server for transmitting the data may code the data. Also, the moving picture data shot by a camera ex116 may be transmitted to the streaming server ex103 via the computer ex111. The camera ex116 is a device such as a digital camera capable of shooting still and moving pictures. Either the camera ex116 or the computer ex111 may code the moving picture data. An LSI ex117 included in the computer ex111 or the camera ex116 actually performs coding processing. Software for coding and decoding moving pictures may be integrated into any type of storage medium (such as a CD-ROM, a flexible disk and a hard disk) that is a recording medium which is readable by the computer ex111 or the like. Furthermore, a camera-equipped mobile phone ex115 may transmit the moving picture data. This moving picture data is the data coded by the LSI included in the mobile phone ex115.

The content supply system ex100 codes contents (such as a music live video) shot by users using the camera ex113, the camera ex116 or the like in the same manner as the above embodiment and transmits them to the streaming server ex103, while the streaming server ex103 makes stream distribution of the content data to the clients at their request. The clients include the computer ex111, the PDA ex112, the camera ex113, the mobile phone ex114 and so on capable of decoding the above-mentioned coded data. In the content supply system ex100, the clients can thus receive and reproduce the coded data, and further can receive, decode and reproduce the data in real time so as to realize personal broadcasting.

When each device in this system performs coding or decoding, the moving picture coding apparatus or the moving picture decoding apparatus, as shown in the above-mentioned embodiment, can be used.

A mobile phone will be explained as an example of the device.

FIG. 19 is a diagram showing the mobile phone ex115 using the moving picture coding method and the moving picture decoding method explained in the above embodiments. The mobile phone ex115 has an antenna ex201 for sending and receiving radio waves to and from the base station ex110, a camera unit ex203 such as a CCD camera capable of shooting video and still pictures, a display unit ex202 such as a liquid crystal display for displaying the data obtained by decoding video and the like shot by the camera unit ex203 and received by the antenna ex201, a body unit including a set of operation keys ex204, a voice output unit ex208 such as a speaker for outputting voices, a voice input unit 205 such as a microphone for inputting voices, a storage medium ex207 for storing coded or decoded data such as data of moving or still pictures shot by the camera, text data and data of moving or still pictures of received e-mails, and a slot unit ex206 for attaching the storage medium ex207 to the mobile phone ex115. The storage medium ex207 includes a flash memory element, a kind of EEPROM (Electrically Erasable and Programmable Read Only Memory) that is an electrically erasable and rewritable nonvolatile memory, in a plastic case such as a SD card.

The mobile phone ex115 will be further explained with reference to FIG. 20. In the mobile phone ex115, a main control unit ex311 for overall controlling the display unit ex202 and the body unit including operation keys ex204 is connected to a power supply circuit unit ex310, an operation input control unit ex304, a picture coding unit ex312, a camera interface unit ex303, an LCD (Liquid Crystal Display) control unit ex302, a picture decoding unit ex309, a multiplex/demultiplex unit ex308, a record/reproduce unit ex307, a modem circuit unit ex306 and a voice processing unit ex305 to each other via a synchronous bus ex313.

When a call-end key or a power key is turned ON by a user's operation, the power supply circuit unit ex310 supplies respective units with power from a battery pack so as to activate the camera-equipped digital mobile phone ex115 for making it into a ready state.

In the mobile phone ex115, the voice processing unit ex305 converts the voice signals received by the voice input unit ex205 in conversation mode into digital voice data under the control of the main control unit ex311 including a CPU, ROM and RAM, the modem circuit unit ex306 performs spread spectrum processing of the digital voice data, and the send/receive circuit unit ex301 performs digital-to-analog conversion and frequency transform of the data, so as to transmit it via the antenna ex201. Also, in the mobile phone ex115, after the data received by the antenna ex201 in conversation mode is amplified and performed of frequency transform and analog-to-digital conversion, the modem circuit unit ex306 performs inverse spread spectrum processing of the data, and the voice processing unit ex305 converts it into analog voice data, so as to output it via the voice output unit 208.

Furthermore, when transmitting e-mail in data communication mode, the text data of the e-mail inputted by operating the operation keys ex204 on the body unit is sent out to the main control unit ex311 via the operation input control unit ex304. In the main control unit ex311, after the modem circuit unit ex306 performs spread spectrum processing of the text data and the send/receive circuit unit ex301 performs digital-to-analog conversion and frequency transform for it, the data is transmitted to the base station ex110 via the antenna ex201.

When picture data is transmitted in data communication mode, the picture data shot by the camera unit ex203 is supplied to the picture coding unit ex312 via the camera interface unit ex303. When it is not transmitted, it is also possible to display the picture data shot by the camera unit ex203 directly on the display unit 202 via the camera interface unit ex303 and the LCD control unit ex302.

The picture coding unit ex312, which includes the moving picture coding apparatus as explained in the present invention, compresses and codes the picture data supplied from the camera unit ex203 by the coding method used for the moving picture coding apparatus as shown in the above embodiment so as to transform it into coded picture data, and sends it out to the multiplex/demultiplex unit ex308. At this time, the mobile phone ex115 sends out the voices received by the voice input unit ex205 during shooting by the camera unit ex203 to the multiplex/demultiplex unit ex308 as digital voice data via the voice processing unit ex305.

The multiplex/demultiplex unit ex308 multiplexes the coded picture data supplied from the picture coding unit ex312 and the voice data supplied from the voice processing unit ex305 by a predetermined method, the modem circuit unit ex306 performs spread spectrum processing of the multiplexed data obtained as a result of the multiplexing, and the send/receive circuit unit ex301 performs digital-to-analog conversion and frequency transform of the data for transmitting via the antenna ex201.

As for receiving data of a moving picture file which is linked to a Web page or the like in data communication mode, the modem circuit unit ex306 performs inverse spread spectrum processing of the data received from the base station ex110 via the antenna ex201, and sends out the multiplexed data obtained as a result of the processing to the multiplex/demultiplex unit ex308.

In order to decode the multiplexed data received via the antenna ex201, the multiplex/demultiplex unit ex308 separates the multiplexed data into a bit stream of picture data and a bit stream of voice data, and supplies the coded picture data to the picture decoding unit ex309 and the voice data to the voice processing unit ex305 respectively via the synchronous bus ex313.

Next, the picture decoding unit ex309, which includes the moving picture decoding apparatus as explained in the present invention, decodes the bit stream of picture data by the decoding method corresponding to the coding method as shown in the above-mentioned embodiment to generate reproduced moving picture data, and supplies this data to the display unit ex202 via the LCD control unit ex302, and thus moving picture data included in a moving picture file linked to a Web page, for instance, is displayed. At the same time, the voice processing unit ex305 converts the voice data into analog voice data, and supplies this data to the voice output unit ex208, and thus voice data included in a moving picture file linked to a Web page, for instance, is reproduced.

The present invention is not limited to the above-mentioned system, and at least either the moving picture coding apparatus or the moving picture decoding apparatus in the above-mentioned embodiment can be incorporated into a digital broadcasting system as shown in FIG. 21. Such ground-based or satellite digital broadcasting has been in the news lately. More specifically, a bit stream of video information is transmitted from a broadcast station ex409 to or communicated with a broadcast satellite ex410 via radio waves. Upon receipt of it, the broadcast satellite ex410 transmits radio waves for broadcasting, a home-use antenna ex406 with a satellite broadcast reception function receives the radio waves, and a television (receiver) ex401 or a set top box (STB) ex407 decodes the bit stream for reproduction. The moving picture decoding apparatus as shown in the above-mentioned embodiment can be implemented in the reproduction device ex403 for reading off and decoding the bit stream recorded on a storage medium ex402 that is a recording medium such as a CD and DVD. In this case, the reproduced video signals are displayed on a monitor ex404. It is also conceived to implement the moving picture decoding apparatus in the set top box ex407 connected to a cable ex405 for a cable television or the antenna ex406 for satellite and/or ground-based broadcasting so as to reproduce them on a monitor ex408 of the television ex401. The moving picture decoding apparatus may be incorporated into the television, not in the set top box. Or, a car ex412 having an antenna ex411 can receive signals from the satellite ex410 or the base station ex107 for reproducing moving pictures on a display device such as a car navigation system ex413.

Furthermore, the moving picture coding apparatus as shown in the above-mentioned embodiment can code picture signals for recording on a recording medium. As a concrete example, there is a recorder ex420 such as a DVD recorder for recording picture signals on a DVD disc ex421 and a disk recorder for recording them on a hard disk. They can be recorded on an SD card ex422. If the recorder ex420 includes the moving picture decoding apparatus as shown in the above-mentioned embodiment, the picture signals recorded on the DVD disc ex421 or the SD card ex422 can be reproduced for display on the monitor ex408.

As the structure of the car navigation system ex413, the structure without the camera unit ex203, the camera interface unit ex303 and the picture coding unit ex312, out of the units shown in FIG. 20, is conceivable. The same goes for the computer ex111, the television (receiver) ex401 and others.

In addition, three types of implementations can be conceived for a terminal such as the above-mentioned mobile phone ex114; a sending/receiving terminal including both an encoder and a decoder, a sending terminal including an encoder only, and a receiving terminal including a decoder only.

As described above, it is possible to use the moving picture coding method or the moving picture decoding method in the above-mentioned embodiments in any of the above-mentioned apparatus and system, and using this method, the effects described in the above embodiments can be obtained.

Furthermore, the present invention is not limited to the above embodiments, but may be varied or modified in many ways without any departure from the scope of the present invention.

As described above, according to the moving picture coding method of the present invention, B-pictures can be coded using pictures which are temporally close in display order as reference pictures. Accordingly, prediction efficiency for motion compensation is improved and thus coding efficiency is improved.

In direct mode, by scaling a first motion vector of a second reference picture, there is no need to transmit motion vector information and thus prediction efficiency can be improved.

Similarly, in direct mode, by scaling a first motion vector substantially used for the direct mode coding of the second reference picture, there is no need to transmit motion vector information, and prediction efficiency can be improved even if a co-located block in the second reference picture is coded in direct mode.

Also, in direct mode, by scaling a second motion vector which has been used for coding a co-located block in a second reference picture, there is no need to transmit motion vector information, and prediction efficiency can be improved even if the co-located block in the second reference picture has only a second motion vector.

Furthermore, in direct mode, by setting forcedly a motion vector in direct mode to be "0", when the direct mode is selected, there is no need to transmit motion vector information nor to scale the motion vector, and thus processing volume can be reduced.

Also, in direct mode, by scaling a motion vector of a later P-picture, there is no need to store a motion vector of a second reference picture when the second reference picture is a B-picture. And, there is no need to transmit the motion vector information, and prediction efficiency can be improved.

Furthermore, in direct mode, since a first motion vector is scaled if a second reference picture has the first motion vector, and a second motion vector is scaled if the second reference picture does not have the first motion vector but only the second motion vector, there is no need to add motion vector information to a bit stream and prediction efficiency can be improved.

In addition, according to the moving picture decoding method of the present invention, a bit stream, which is generated as a result of inter picture bi-prediction coding using pictures which are located temporally close in display order as first and second reference pictures, can be properly decoded.

INDUSTRIAL APPLICABILITY

As described above, the moving picture coding method and the moving picture decoding method according to the present invention are useful as a method for coding picture data corresponding to pictures that form a moving picture to generate a bit stream, and a method for decoding the generated bit stream, using a mobile phone, a DVD apparatus and a personal computer, for instance.

The invention claimed is:

1. A coding method for coding a picture, said coding method comprising:
   a coding step of determining, with a coding unit, two motion vectors for a current block to be coded, based on one motion vector of a co-located block which is a block included within a previously coded B-picture and co-located with the current block, and coding the current block by performing motion compensation on the current block in direct mode using the two motion vectors for the current block and two reference pictures which correspond to the two motion vectors for the current block,
   wherein said coding step includes:
   in the case where the co-located block has been coded using two motion vectors and two reference pictures which respectively correspond to the two motion vectors of the co-located block,
   specifying, as a specified motion vector, one of the two motion vectors of the co-located block;
   generating the two motion vectors for the current block that are used for performing direct mode motion compensation on the current block, by scaling the specified motion vector by a ratio of a first difference and a second difference, the first difference being a difference between display order information of a reference picture corresponding to the specified motion vector and display order information of the previously coded B-picture including the co-located block, and the second difference information being a difference between display order information of the reference picture corresponding to the specified motion vector and display order information of the current picture including the current block; and
   coding the current block by performing motion compensation on the current block in direct mode using the generated two motion vectors for the current block and two reference pictures, said two reference pictures being the reference picture corresponding to the specified motion vector and the previously coded B-picture including the co-located block, and said two reference pictures respectively corresponding to the generated two motion vectors.

2. The coding method according to claim 1,
wherein the two reference pictures which respectively correspond to the two motion vectors for the current block are a first reference picture and a second reference picture,
the first reference picture is the previously coded B-picture including the co-located block, and
the second reference picture is one of the two reference pictures used for coding the co-located block and corresponds to the motion vector scaled for generating the two motion vectors for the current block.

3. The coding method according to claim 1,
wherein in the case where the co-located block has been coded in direct mode, the two motion vectors for the current block are generated using one of the two motion vectors used for coding the co-located block.

* * * * *